United States Patent [19]

MacArthur et al.

[11] Patent Number: 5,301,101
[45] Date of Patent: Apr. 5, 1994

[54] RECEDING HORIZON BASED ADAPTIVE CONTROL HAVING MEANS FOR MINIMIZING OPERATING COSTS

[75] Inventors: J. Ward MacArthur; David A. Wahlstedt; Michael A. Woessner; Wendy K. Foslien, all of Minneapolis, Minn.

[73] Assignee: Honeywell Inc., Minneapolis, Minn.

[21] Appl. No.: 47,768

[22] Filed: Apr. 14, 1993

Related U.S. Application Data

[63] Continuation-in-part of Ser. No. 541,558, Jun. 21, 1990, abandoned.

[51] Int. Cl.$^5$ ............................................. G05B 13/04
[52] U.S. Cl. .................................... 364/156; 364/151; 364/157
[58] Field of Search .................... 364/156, 151, 157

[56] References Cited

U.S. PATENT DOCUMENTS

| | | | |
|---|---|---|---|
| 4,349,869 | 9/1987 | Prett et al. | 364/159 |
| 4,616,308 | 10/1986 | Morshedi et al. | 364/159 |
| 4,736,316 | 4/1988 | Wollman | 364/157 |
| 4,769,766 | 9/1988 | Tung | 364/157 |
| 4,959,767 | 9/1990 | Buchner et al. | 364/157 |

OTHER PUBLICATIONS

Cutler et al., "Dynamic Matrix Control-A Computer Control Algorithm", (Publication Unknown).
Morshedi et al, "Optimal Solution of Dynamic Matrix Control with Quadratic Programming Techniques", pp. 679–689 (Publication Unknown), 1985.
Ydstie et al, "Theory and Application of an Extended Horizon Self-Tuning Controller", Aiche Journal, v. 31, No. 11, pp. 1771–1780.

*Primary Examiner*—Jerry Smith
*Assistant Examiner*—Cameron H. Tousi
*Attorney, Agent, or Firm*—Michael B. Atlass

[57] ABSTRACT

Disclosed is an adaptive and predictive controller having self tuning capabilities. The receding horizon window and sample interval are determined by the tunning mechanism automatically, based on the relationship between the controlled and manipulated variables. The interval and window may be set by the user as well. Constraints on the manipulated and controlled variables at the end of the horizon window are accommodated automatically. In addition to providing servo regulatory control the invention teaches simultaneous minimization of operating costs.

16 Claims, 19 Drawing Sheets

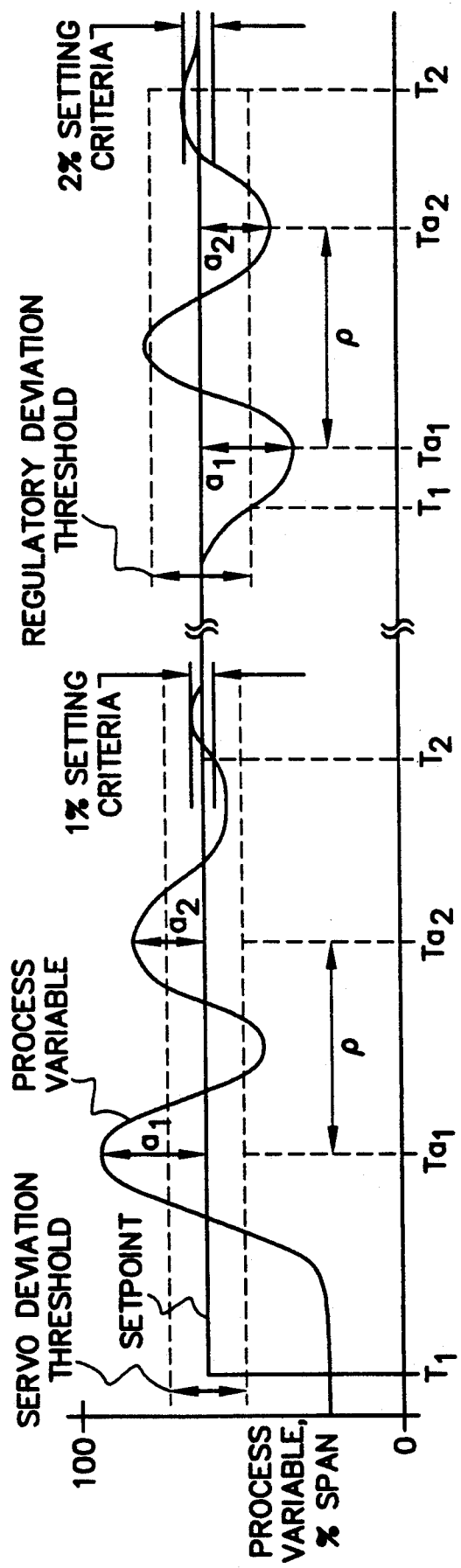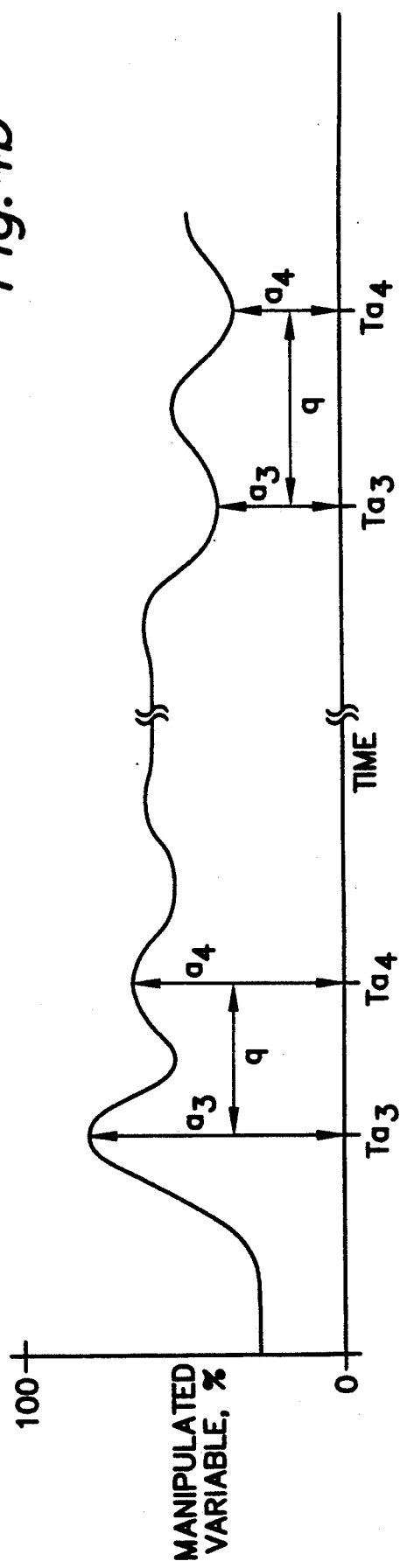
Fig. 4a
Fig. 4b

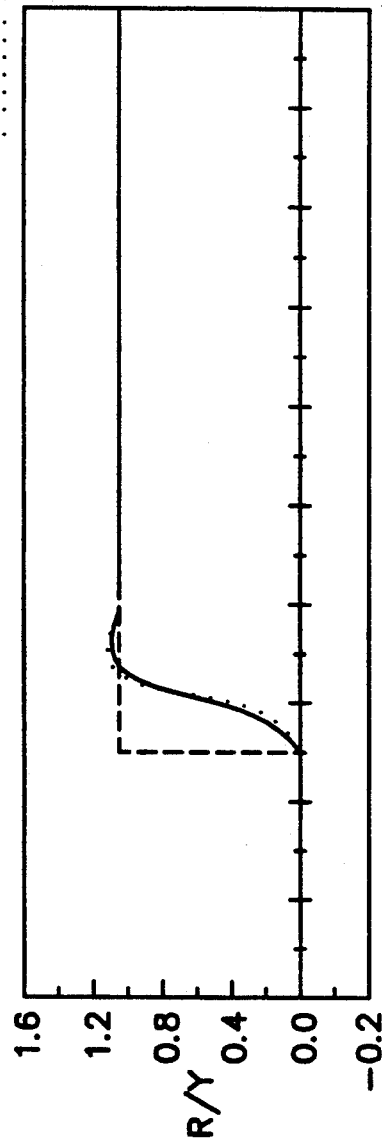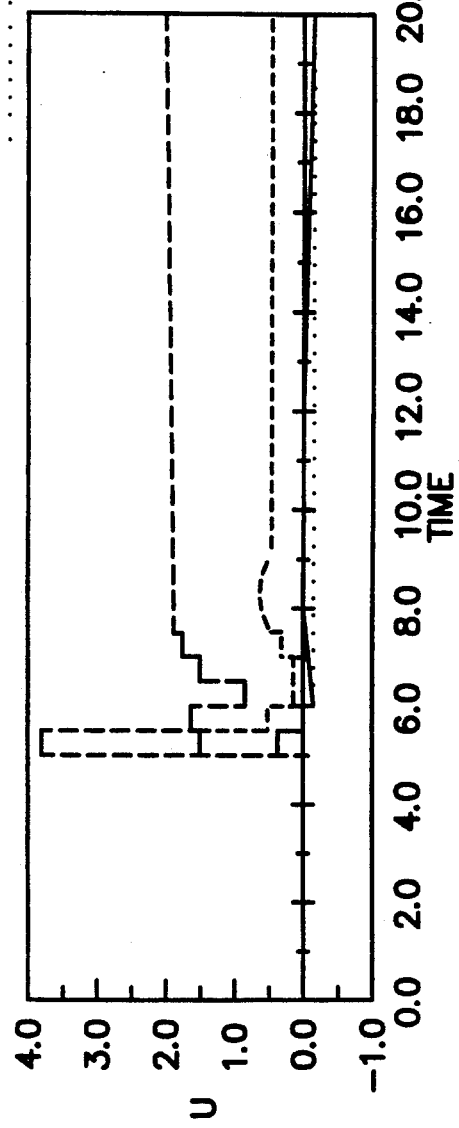

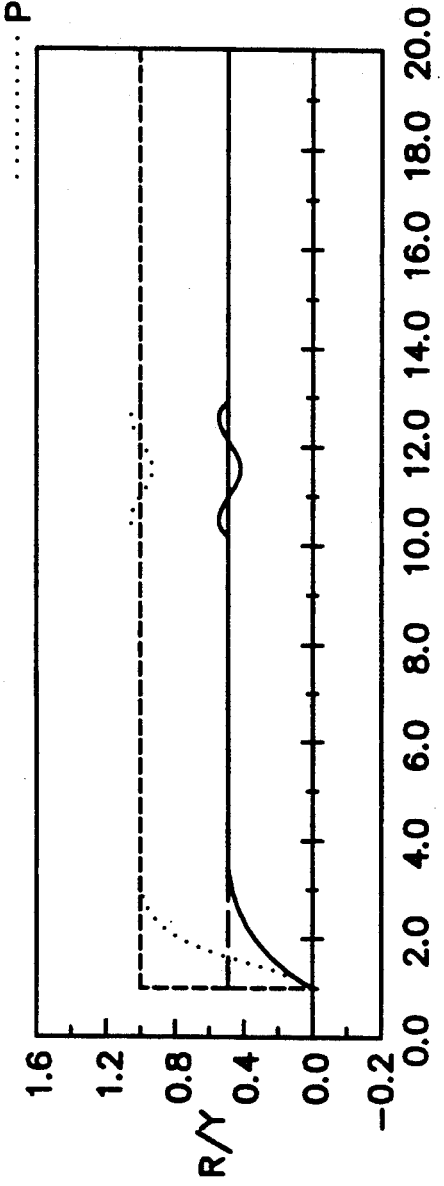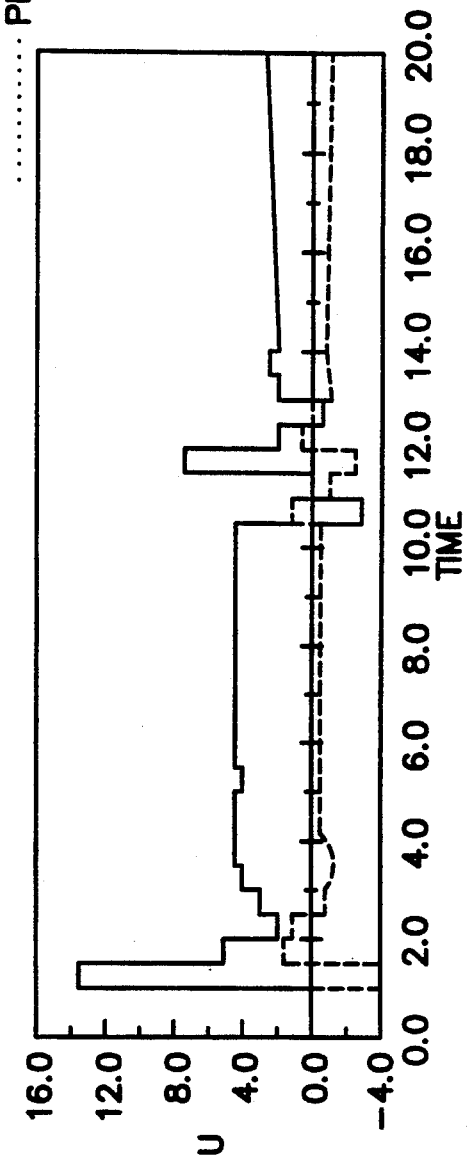

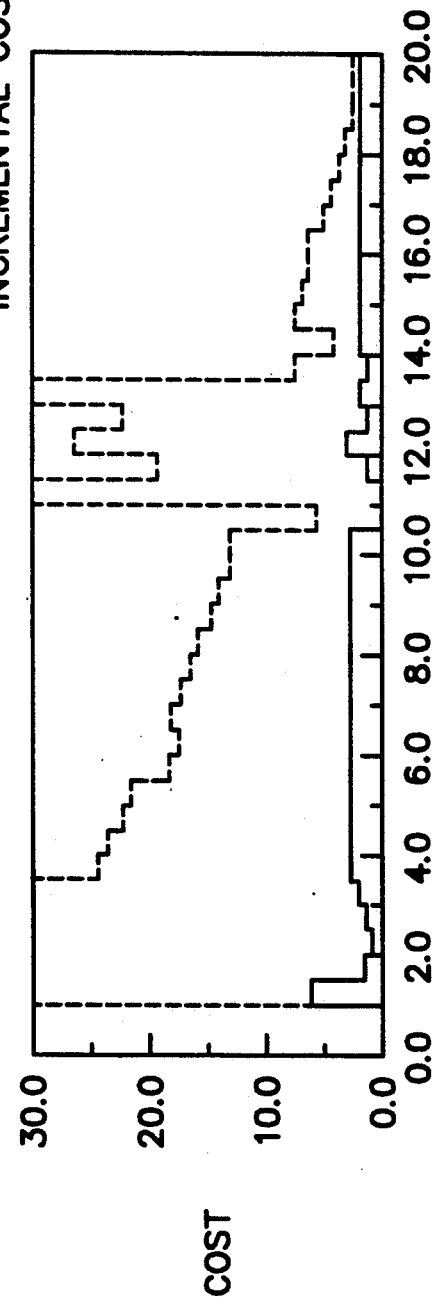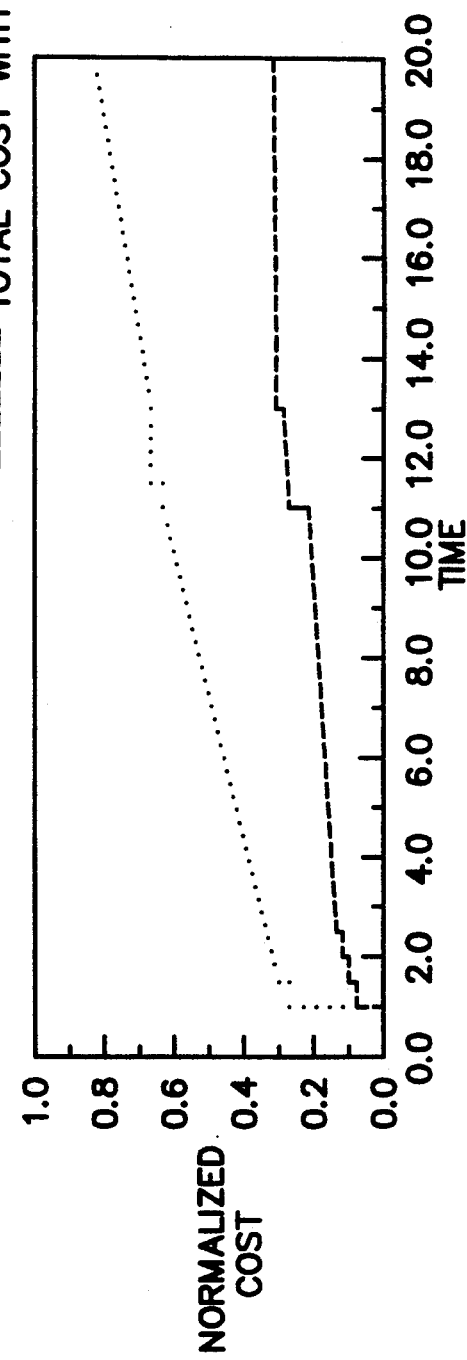
Fig.14a
Fig.14b

RECEDING HORIZON BASED ADAPTIVE CONTROL HAVING MEANS FOR MINIMIZING OPERATING COSTS

This application is a continuation-in-part of application Ser. No. 07/541,558, filed Jun. 21, 1990 now abandoned.

This invention relates to systems having automatic feedback capabilities wherein the controller provides controls over inputs (manipulated variables) to adjust a process or an environment, and wherein outputs (controlled variables) from that controlled environment or process provide inputs to the controller.

More specifically this patent provides a description of the controller features which allow the controller to operate in a predictive manner on a multiplicity of variables with the ability to perform nonlinear cost minimization.

BACKGROUND OF THE INVENTION

Fundamental to the performance of any control algorithm, is its servo-regulatory ability. That is, changes in the set-point should be tracked quickly and smoothly and the controlled variable should be kept at or near its set-point despite unmeasured disturbances affecting the process. In addition the controller should maintain stability and acceptable control performance in the face of structural and/or parametric uncertainty. In certain applications the cost of providing effective control is also a significant factor. While most multivariable control laws utilize some form of cost minimization, the costs typically reflect control movement rather than actual costs. The invention described in this patent teaches a scheme that is based on minimizing costs while still providing effective control. The nonlinear cost functions used in defining the control sequence can be stated to reflect either actual operating costs (dollars) or auxiliary costs (efficiency, quality, etc.) Cost minimization is predicated on the assumption that there are more manipulated variables than controlled variables. Thus it is up to the controller to allocate the correct blend of the manipulated variables such that both control and cost objectives are met. The control scheme described herein was designed specifically to address these basic criteria.

A predictive control law provides the fundamental structure for the new controller. The adaptive controller utilizes a receding horizon formulation. The receding horizon formulation can be used for multivariable control with or without cost minimization. It can also be used for robust univariate servo-regulatory control. Predictive control in and of itself is by no means new. Indeed predictive control is the central theme behind the benchmark works of Cutler and Ramaker in their Dynamic Matrix Control (DMC) algorithm (Cutler, C. R., and B. L. Ramaker, "Dynamic Matrix Control—A Computer Control Algorithm," *Joint Automatic Controls Concerence Proceedings*, San Francisco (1980)) and Richalet et. al. in their Model Algorithmic Control (MAC) algorithm (Richalet, J. A., A. Rault, J. D. Testud, and J. Papon,, "Model Predictive Heuristic Control: Application to Industrial Processes," *Automatica* 14, 413 (1978)).

Much of the current control work reported in the literature today is based in some degree on these approaches. Horizon based prediction and control has also been described and implemented in the past (Tung, L. S., "Sequential Predictive Control of Industrial Processes," *Proc.* ACC, San Francisco (1983); Ydstie, B. E., L. S. Kershenbaum, and R. W. H. Sargent, "Theory and Application of an Extended Horizon Controller," *AIChE J.*, 31, 771 (1985); and Lee, K. S., and W. K. Lee, "Extended Discrete Time Multivariable Adaptive Control Using Long Term Predictor," *Int. J. Control*, 38, 495 (1983)). The unique aspects of the new control law described herein are that it combines the attractive features of DMC and horizon control and eliminates the inherent disadvantages of the original formulations.

In DMC there is no direct mechanism to tune the controller. In addition the size of the matrix to be inverted at each control update is specified by the number of input terms used in the prediction. These deficiencies which cause considerable practical difficulties in implementing a controller based on such strategies can be eliminated by using a horizon formulation. Unfortunately, previously known horizon based techniques do not eliminate the impracticalities since the number of terms that need to be estimated by the identifier depend on the horizon window. For many uses this can be computationally too burdensome to be acceptable. In the new formulation, a horizon based technique is utilized where the prediction is accomplished using an auto-regressive moving average (ARMA) model in a recursive fashion. In addition, the controller using the new control law described herein allows for the direct imposition of constraints on both process and control outputs at the end of the horizon window.

Use of optimization strategies in plant operation is also not a new concept. Many optimization techniques are global strategies that determine appropriate allocation levels among competing resources. Typically the global approaches do not take into account transient performance at the regulatory level. In a recent patent (U.S. Pat. No. 4,873,649) Grald and MacArthur teach an on-line method for control of vapor compression space conditioning equipment such that COP (coefficient of performance) is optimized. The optimization technique however does not deal directly with transient response and hence satisfactory servo-regulatory performance can not be insured. Morshedi et al (Morshedi, A. M., C. R. Cutler, and T. A. Skrovanek, "Optimal Solution of Dynamic Matrix Control with Quadratic Programming Techniques (QDMC)," *Proc. ISA*, Part 1, 40 (1985)) describe a pseudostatic approach for incorporating cost into the control design. In their formulation the manipulated variables in question are assigned pseudo set-points which are determined by solving a static linear optimization subproblem for the final value of the inputs. The nominal inputs are then treated as controlled variables with their set-points given by the computed values of the steady state inputs. The conventional control strategy is then augmented to reflect this additional information.

In the controller described in the instant patent, a technique for coupling dynamic nonlinear cost minimization with uncompromised servo-regulatory response is accomplished for the first time. While cost minimization is a desirable option of the controller, robust servo-regulatory performance is still the fundamental objective. To this end one simple form of the controller uses a multivariable feedforward/feedback algorithm. Feedforward compensation offers the potential for improved control performance since it allows the controller to react before a measurable disturbance has a chance to affect the response of the plant. In addition, as will be described later, it provides the mechanism for coupling the cost minimization to the desired servo-regulatory response.

To be effective, the controller requires an internal model that relates all controller outputs and measurable disturbances to all process outputs. (The process outputs are the outputs of the plant as indicated by sensing means located proximate thereto.) The parameters of this internal model are determined on-line by measuring the system response to the controller outputs over time, and provide the adaptive ability of the controller. Evaluation of the unknown model coefficients for each process output is accomplished by a recursive least squares (RLS) estimate. Other standard techniques may be used to accomplish this model identification and are well known.

While techniques for model identification are well known, insufficient excitation or inappropriate sample rate selection will render the identification inaccurate. The invention described in this patent teaches a method for automatically determining the correct control and identification sample rate. In addition, a technique is given for automatically selecting the horizon window and for adjusting the control algorithm when excitation is insufficient for accurate model identification.

SUMMARY OF THE INVENTION

With the advent of controllers having computer resources integrally built in (or microcomputer-based controllers), more sophisticated control functionality such as is taught in this patent is possible by utilizing the memory and processing capability that accompanies the micro-computer to implement a control program.

The main objective of the present invention is to provide a new and improved means for efficient robust adaptive control with the ability to control a plurality of process outputs such that operating efficiency is maximized or operating costs are minimized.

Equipped with or connected to sensor means, microcomputer means, memory means, and actuator means, the microcomputer-based controller can measure the desired process output variables. From these measurements and user inputs the controller can automatically determine the appropriate identification and control sample rate as well as the horizon window, estimate and continuously update a dynamic model of the process being controlled, predict the future effect of current and past inputs on process outputs over the horizon window, determine the appropriate sequence of control moves to insure that all process outputs attain their user specified set-point by the end of the horizon window, impose user specified constraints on manipulated and controlled variables, determine the control moves which result in minimum cost or maximum efficiency without compromising servo-regulatory control, and output these efficient control moves as signals to the actuators.

An exemplary use of the controller taught herein would be to employ it in conjunction with a variable speed vapor compression heat pump to maintain a comfort level set by the occupants of a building. In this exemplary use, the occupants (user) would specify the setpoint (comfort level) and the controller would adjust the compressor speed, blower speed and evaporator superheat to maintain comfort at the desired set-point while insuring maximally efficient operation. Since this strategy results in optimal control, it is apparent that in steady state operation any other choice of compressor speed, blower speed and evaporator superheat will result in either increased energy consumption or reduced comfort.

Previous attempts at incorporating optimization into regulatory control have failed to recognize that static or pseudostatic techniques do not correctly deal with transient operation due to set-point or load changes.

A state-of-the-art configuration of the control system according to the present invention provides a process control means having a microcomputer with a real-time clock, memory and floating point processing. It will have a data input means through which the user can specify desired set-points and constraints, overriding the horizon determined by the tuner and selecting perturbation step(s) for initial identification if desired, and mode selection (auto, manual, tune). The system will likely have multiple sensors for measuring all parameters necessary for control purposes although in some instances only one sensor will be needed. There should be at least as many sensor outputs as controlled variables. The system also needs to be able to provide manipulated variable (also called control output) signals to an actuator or actuators. In the preferred embodiment, the adaptive receding horizon control program is in the controller's memory; however, it is possible to implement the scheme in hardware. The controller provides fundamental robust servo-regulatory control based on multiple sensory data. The controller calculates the control and identification sample rate and to synthesize a dynamic process model, and predicts future effects of control moves on process outputs. The controller also employs optimization to minimize operating cost without compromising servo-regulatory behavior.

The above and other objects, features and advantages of the invention will become more apparent from the ensuing detailed description taken in conjunction with the accompanying drawings and appended claims.

In some situations, the Receding Horizon Control (RHC) may suggest control moves which are greater than the actuator can perform. In such situations, it is useful to use other manipulated variables to control other actuators to assist in accomplishing the desired result or achieving set point. The ability to switch to other control actuators can be accomplished with some additional features described herein. These additional features also accommodate situations wherein one wishes to not only avoid only the unacceptable control instructions but also to enhance the cost control function by assigning a primary status to control moves of the less costly function(s) and secondary status to control moves of more costly control function(s). These additional features include having a separate RHC for each of the manipulated variables and setting each RHC for a new feedback data path and adding a constraint handling logic selector which both selects which RHC output to use, and may also provide feedback to one or more RHC units.

The concept is taught with reference to a two-actuator system having cubic feet per minute (CFM) and compressor revolution per minute (RPM) actuators (a fan and a compressor motor), as would be typical in a heating or cooling air system. A CFM move is considered less costly, in general, than an RPM control move.

In the event the CFM control move that is required to satisfy the criteria for the controller is out of range for the CFM fan to accomplish, the system will accommodate this by making an RPM control move. In the cost function case, where the size of the CFM control move required for achieving set point is not near the least cost curve, and where the same or better result can be achieved with an RPM control move, the RPM control move is made. The cost function in this example is called the Coefficient of Performance, or COP, by those of ordinary skill in this industry.

In this invention this is done by the constraint handler determining that at least some portion of the CFM-Primary sequence of control moves are for out-of-range (or out of proper cost) conditions. Where that is the case, feedback is supplied to the RPM optimizing RHC indicating that CFM is constrained. The RPM optimizing RHC then uses these constrained values and computes the control moves for RPM required to achieve setpoint within m control moves and maintain stability for m and L control moves with the constrained CFM.

The end result of this process is a CFM and RPM control value supplied to the process (55 of FIG. 15). A multiplicity of RHC units may be configured into a larger system having a multiplicity of control outputs (n in FIG. 16).

BRIEF DESCRIPTION OF THE DRAWINGS

FIGS. 4a and 4b are graphs of a response variable and a manipulated variable, respectively, illustrating the hueristics used for control adaptation during process upsets.

FIGS. 9a and 9b are graphs of the same variables used in FIGS. 8a and 8b, respectively, and show the servo-performance of the controller for set point response with cost minimization taught by this patent.

Paired FIGS. 12a and 12b, and 13a and 13b are graphs of the response and manipulated output variables, respectively, in each pair, showing controller performance for various set point and load disturbances.

FIGS. 14a and 14b are graphs showing cost performance of the controller corresponding to the servo-regulatory performance illustrated in FIGS. 12a through 13b.

DESCRIPTION OF THE PREFERRED EMBODIMENT

Figure 1:
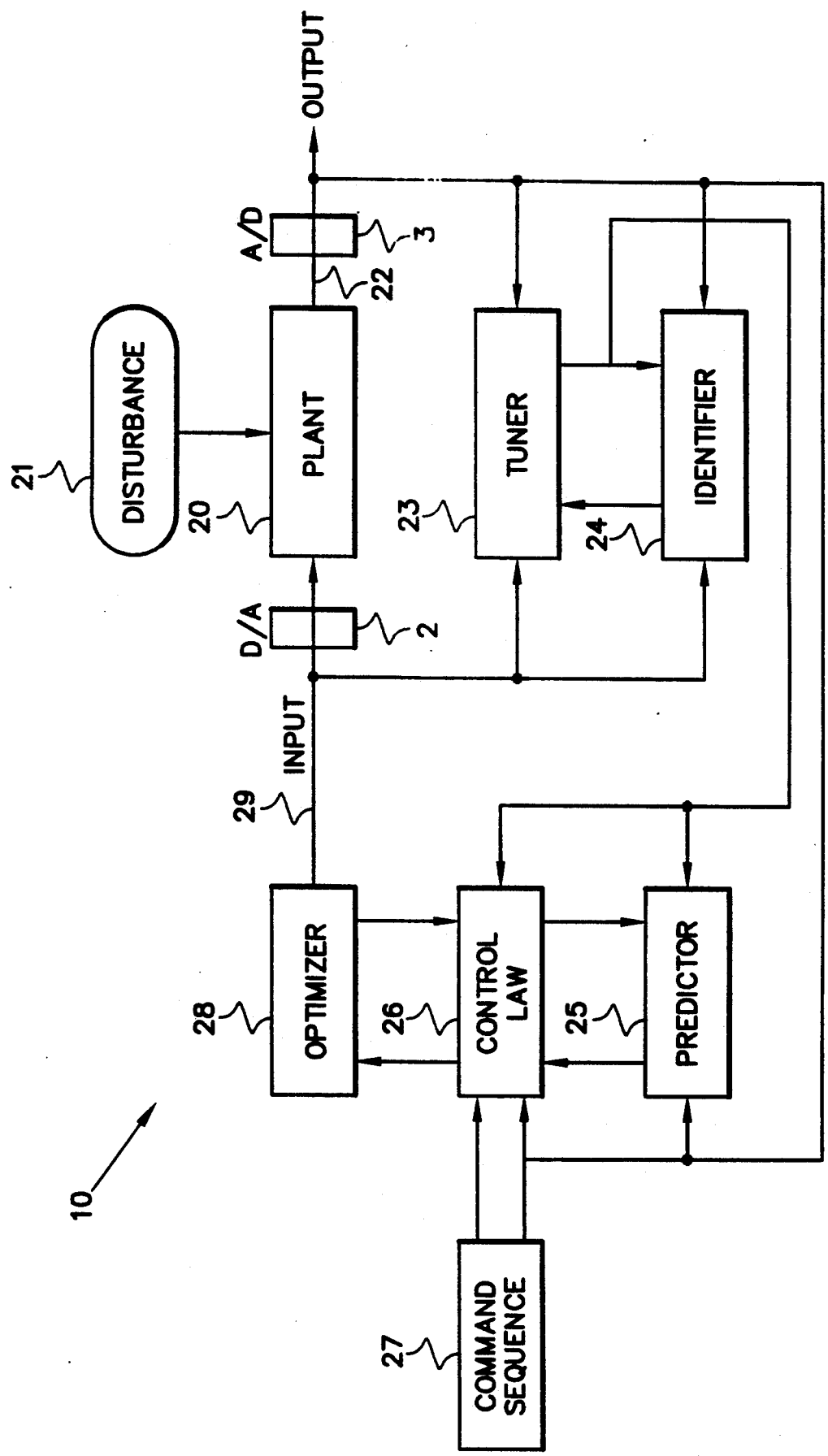
FIG. 1 is a block diagram of the preferred embodiment of the control system showing interactive channels between elements.

A preferred embodiment of the control system of the invention will now be described with reference to FIG. 1. As shown in FIG. 1, the controller is composed of several interacting components. The overall block diagram of the dynamic system 10 comprises both the controller (which has components 23, 24, 25, 26, and 28 and works with the inputs from interface unit (sometimes called a sequencer 27)) and the environment (identified as plant 20) for which the controller is responsible. The plant 20 may be exposed to unmeasured disturbances represented here by disturbance 21, which may affect the plant 20 but which is only measurable by its influence on the plant output(s) 22. At least one and probably a multiplicity of sensors are provided that measure and report on the plant 20 (but are not shown). These sensors monitor and report on the output(s) 22 from plant 20. For example, to reference the heat pump mentioned in the Summary of the Invention, the sensors may measure the humidity, temperature, et cetera. As illustrated in FIG. 1, the outputs of these sensors are shown as line 22. These output(s) provide input to and affect the tuner 23, the identifier 24, the predictor 25, the control law 26 and indirectly the optimizer 28.

Analog to Digital (A/D) and Digital to Analog (D/A) conversion boxes are shown at locations 1 and 2 to indicate appropriate placement. However, if the entire controller, or parts thereof are implemented in analog components whether different placement or removal would be indicated, as will be apparent to one of ordinary skill in this art.

Data input means are provided for establishing a link between the user and interface unit 27. User input data is accomplished via user manipulation of this interface 27. The user may change the horizon window, define cost functions or, to cite a simplistic single variable example, change the set-point. Various forms of interface devices may be used without deviation from this invention.

Components 23, 24, 25, 26, and 28 provide the fundamental features of the controller. These elements can be configured in either software or firmware as desired by the builder of the controller. A brief description of the functionality of each component follows.

Outputs from the sensing elements at plant 20 and outputs from the interface unit 27 are either converted to, or already are in digital form. These signals are supplied to a microcomputer device in the controller which may be a single processor performing variety of the component functions over time, as directed by programming control, as will be understood by one of ordinary skill.

Tuner 23 is responsive to said sensing element output(s) and interface 27 output as well as to the outputs of control law calculator 26 and identifier calculator 24. The tuner is activated upon start-up, i.e., when the controller is commissioned. In the manual mode (a mode in which the manipulated variables are held fixed as set directly by the user), the tuner forces a step change to each of the controller outputs 29. Said tuner monitors the process response and based on the time history of the process response, selects the appropriate control and identification sample rate as well as the horizon window, and makes these parameters available as outputs.

After the appropriate sample rate and horizon have been determined, the tuner invokes identifier calculator 24 which is responsive to sensor outputs 22 and the outputs of the control law calculator and said tuner calculator. The invocation is done in the preferred embodiment by having the tuner repeatedly send data as it is developed by the tuner. Data recorded by tuner calculator during the open loop step is then used to drive said identifier. The output of said identifier calculator is the dynamic process model. As discussed in the Summary of the Invention, any number of modeling techniques could be employed. Once identification is complete, the model is then made available to predictor calculator 25 and said control calculator 26.

The manual mode is then terminated and automatic control commences. At this point, the identifier remains active continually monitoring the process response. Said tuner is also used to monitor the process in normal automatic (also called closed loop) operation. If the control performance degrades, said tuner will adjust the control parameters in a heuristic fashion based on frequency response data. If control performance is unacceptable, said tuner will recommission itself as described above.

The optimizer calculation means 28 is responsive to said control and predictor calculation means. Said optimizer 28 continuously searches for alternate control sequences that result in a lower cost of operation. Within each time step said optimizer uses both 25 and 26 to determine the control moves that result in minimum cost yet offer uncompromised servo-regulatory control performance.

The control sequence is determined by said control law calculator 26 based on said predictor calculator 25. Said predictor 25 is responsive to the tuner, the control calculator, and uses the discrete time model obtained from the identifier to determine the nominal output trajectory that would occur if no future changes are made to the input. The output of the predictor calculator is the nominal output trajectory which is based on current and past recorded data. The control calculator is responsive to; interface 27, prediction calculator, tuner, identifier calculator, and optimizer calculator for affecting the calculation of the values for each of the manipulated variables. The control variable command signals may be converted to analog outputs by a D/A converter where the equipment requires analog input.

In the discussion below, a more detailed description of the tuner, the the control law calculator, the predictor calculator, and the optimizer will be given.

THE TUNER

As described previously, the primary function of the tuner is to select the appropriate control and identification sample rate and the horizon window. These parameters can be directly determined from the open-loop response characteristics of the process. The selection is based on settling time for overdamped open-loop processes and on rise time and period of oscillation for underdamped open-loop processes. For overdamped systems the sample rate is determined by recording the settling time and dividing this number by five times the minimum number of terms in the predictive model. For underdamped systems the sample rate is determined by recording the time to reach the second inflection point and dividing this number by five times the minimum number of terms in the predictive model. For open-loop-unstable processes, the sample rate is determined by recording the time taken to exceed a predefined range limit (set by the user). This number is then divided by twice the minimum number of terms in the predictive model to determine the sample rate. The default horizon is set to fifteen times the sample rate. While other numbers could be used, experience shows these to be most reliable.

The following is a detailed description of the method used for determining an appropriate horizon overdamped systems. The basic concept is to apply a step in the process input and observe the process output in order to determine the maximum slope, the time at which it occurs, the magnitude of the output at that time, and ultimately the settling time of the response. Establishing reliable time/slope data with no a priori process knowledge in spite of noise-corrupted data is the primary contribution of the tuner. Although for overdamped systems the settling time is itself sufficient to determine the window and sample rates for the preferred implementation, the approach can also be used to fit a second order model with delay to the observed data. Numerical techniques relating the transport delay, gain and time constants to the time/slope information are well known and will not be discused here.

Figure 2:
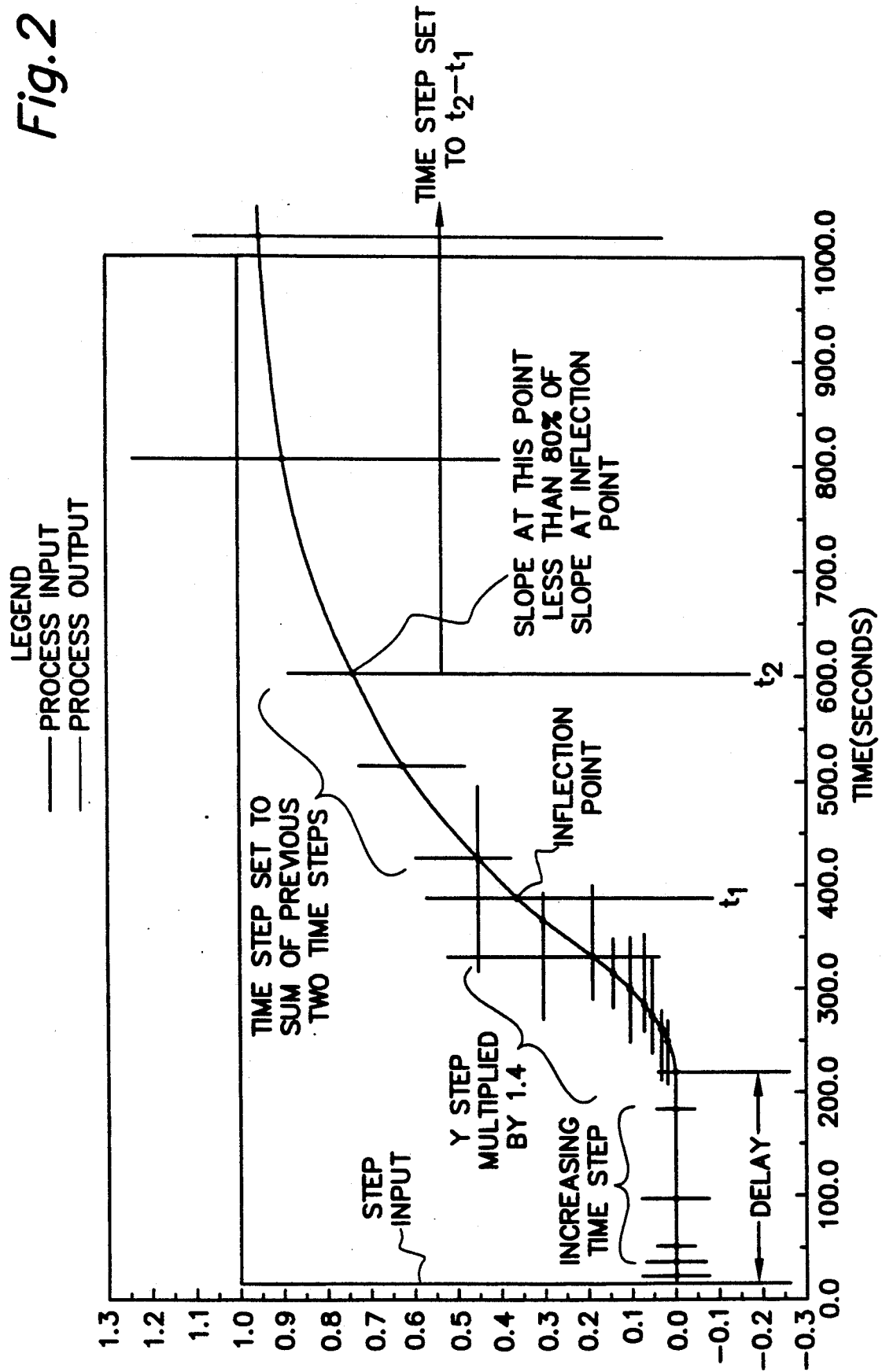
FIG. 2 is a graph used to show the concept used by the tuner to evaluate critical process response parameters for use in determining sample rate and horizon window.

FIG. 2 illustrates graphically the concept used by the tuner. The tuner assumes the value of the output will start at zero and makes sure the output value changes in the positive direction when the step in the input occurs. Based on the direction of the control input step and the direction of control (reverse- or direct-acting), the expected direction of movement of the output is determined. If a negative change is expected, the output is multiplied by $-1$. This output value, which starts at zero and changes in the positive direction, is what is referred to as "the output" in the remaining of the description of the tuner.

To reduce the effect of noise, the output is averaged over a number of samples. The number of samples used depends on the response of the system and is determined differently in various stages of the analysis. A running sum of the output is kept, and when established criteria (described in the following paragraphs) are met, this sum is divided by the number of samples included in the summation to yield the average output value for that time period. The goal is to average over as many steps as possible to allow the algorithm to function accurately in the presence of large noise levels, without letting the average continue right through the significant changes in the output. The averaged output value is referred to as "y", and the slope of y with respect time as "dy". The time, referred to as "t", associated with each y value is the time at the middle of the range of samples averaged. The slope associated with a given y and t is calculated as the average of the slopes from y to the previous y and from y to the next y.

The tuner begins by looking for the point at which the slope begins to decrease (the inflection point). When the inflection point is found, a parabola of dy as a function of t is fit to the first point at which the slope decreases and the two which precede it. The slope and time of the inflection point are determined by finding the maximum dy of the parabola and the associated time. The y value at the inflection point is obtained by interpolation. These values are saved as t1, y1, and dy1. In the presence of noise, false inflection points may be found (when the slope in the noise decreases), but these are detected and handled in the later phases of the analysis.

The length of time over which to average for this initial stage of the analysis is limited by two criteria. When one average is calculated, a y limit and a t limit are set and when either one of these limits is exceeded, the next average is calculated. The time limit is set to the twice the previous time limit, with an initial time limit of one time step. The y limit is set to 1.4 times the largest non-averaged y value occurring since the beginning of the run. The y limit is the most important because it is the one which determines the appropriate spacing of the averages through the significant changes in the output. By the time the output reacts to the step input, the t limit can grow to be large enough to miss the entire change in the output, but the y limit (which gets set to 1.4 times the noise) forces the averaging to occur frequently enough to provide several data points through the area of the inflection point. If, instead of 1.4, a smaller value were used the allowable noise to signal ratio of the system would be reduced, since the averages would be calculated more frequently and the effect of the noise would be reduced less. If a much larger value were used, the y limit would be set above the line-out value of the output before the inflection point was found meaning it would be missed completely.

In the next phase of the analysis, the tuner will determine whether it has found a false inflection point. It will look for the point where the slope decreases to less than 80% of the slope at the inflection point. If, during this phase, the slope either increases twice in a row or becomes greater than the slope at the inflection point, the inflection point is considered to be false and the tuner reverts back to the initial phase and looks for another decrease in slope. In this phase and in later phases, the y limit is abandoned and a time limit equal to the total time spanned by the three averages around the inflection point is used. When a slope less than 80% is found, the t, y, and dy values are saved as t2, y2, and dy2. (The 80% figure has yielded good results, but a similar number could be employed.)

In the third phase of the analysis, the tuner is just looking to make sure it was not just an artifact of the noise that created an apparent inflection point. The time limit for the averages is set equal to t2 minus t1 (the time to get from maximum slope to 80% slope). If the slope increases or goes negative in either of the next two averages, the inflection point is considered false and again the tuner reverts back to the initial phase and looks for another decrease in slope. Beyond this phase there are no more checks for false inflection points, but one could include more if desired.

In the final phase of the analysis, the tuner determines the settling time. The time limit used is the same as in the previous phase. There are three criteria, any one of which is considered to constitute line-out (also known as reaching approximate steady state): (1) if the absolute value of the slope is less than 5% of dy1 (the slope at the inflection point) three times in a row; (2) if the value of y decreases and remains lower than its largest value for three averages in a row; or (3) after ten averages are calculated in this phase.

Figure 3:
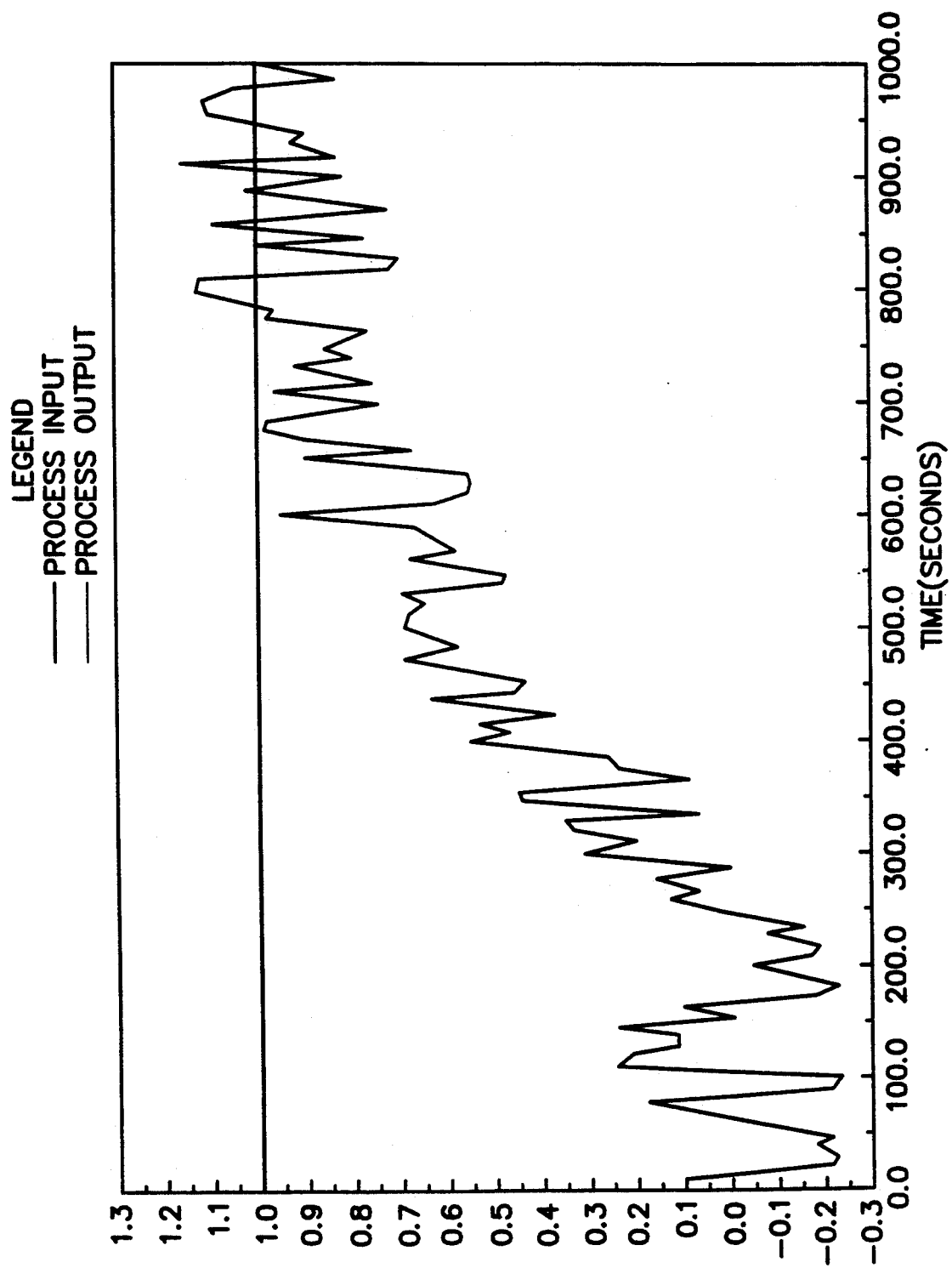
FIG. 3 is a graph of the performance of the tuner with 50% full scale noise.

FIG. 3 shows a process reaction curve contaminated with noise. The actual process has a transport delay of 200 seconds, a unity gain and two time constants of 150 and 160 seconds. The tuner was able to determine settling time, and the maximum slope and the time at which it occurred with sufficient accuracy to identify the process time constants, gain and transport delay with a maximum error of 10%.

The tuner also acts as a heuristic supervisor which monitors the controller output (manipulated variable, also line 29 of FIG. 1) and the measured process output (process variable, also line 22 of FIG. 1) for symptoms of system instability during automatic control mode. Upon detection of unacceptable system stability, the tuner, acting as heuristic supervisor, applies a set of recovery rules to stabilize the system.

The heuristic supervisor's corrective actions may include changing the identified process model or altering the horizon window to recover from the observed instability. In the preferred embodiment the heuristic supervisor is limited to one model change per system upset (set-point change or system disturbance) but can alter the horizon window any number of times. If a model change has been necessary to stabilize the system, the heuristic supervisor switches the controller into manual control mode and forces a complete system re-tune as described previously.

The heuristic supervisor monitors the process variable at all times during automatic control mode whereas the manipulated variable is monitored only after a window is computed directly from observed system dynamics. The formulation of this manipulated variable observation window is discussed below.

The process variable parameters identified by the heuristic supervisor during a system upset are shown in FIGS. 4a and 4b. These are the peak amplitudes, $a_1$ $a_2$, the dimensionless amplitude decay ratio, d, the period of oscillation, p, and the closed loop settling time, $T_s$. The amplitude decay ratio is defined as:

$$d = a_2/a_1$$

and the period of oscillation as:

$$p = T_{a_2} - T_{a_1}$$

The heuristic supervisor continues to monitor the process variable with respect to the set-point change until the process variable satisfies a one percent settling criteria (as indicated in FIG. 4a). When this settling criteria is satisfied, the closed loop settling time is computed as:

$$T_s = T_2 - T_1$$

In cases where the oscillations persist and continue to break the servo-deviation threshold, the heuristic supervisor detects each new peak and computes a new decay ratio and period of oscillation, respectively. The settling time cannot be computed because the settling criteria has not been satisfied.

In cases where the settling criteria is satisfied, the heuristic supervisor begins monitoring the process variable with respect to system disturbances, looking for the process variable to break the regulatory deviation threshold. If this threshold is broken, the heuristic supervisor notes the break time as $T_1$ and begins recording peak amplitudes and their respective time of occurrence. Once successive peaks are observed, the heuristic supervisor computes a decay ratio and period of oscillation, respectively. If the process variable satisfies the two percent settling criteria, $T_2$ is determined and the closed loop settling time can be computed. This observation procedure of the process variable continues indefinitely as long as the system remains in automatic control mode.

The process variable's period of oscillation, p, is used to define the sliding manipulated variable observation window, w, as:

$$w = p$$

over which the heuristic supervisor monitors the manipulated variable, recording peak amplitudes and their time of occurrence. This definition relates the window to the closed loop system dynamics. The window is recalculated each time a new period of oscillation is computed for the process variable. Referring now to FIG. 4b, respective manipulated variable amplitude peaks, $a_3$ and $a_4$, are identified and an associated period of oscillation, q, is computed as:

$$q = Ta_4 - Ta_3$$

Because it is not accurately known to what value the manipulated variable would dampen under steady-state conditions, a manipulated variable decay ratio and settling time are not definable. Instead, a peak-to-peak amplitude difference, b, is computed as:

$$b = |a_3 - a_4|$$

This observation procedure of the manipulated variable continues indefinitely as long as the system remains in automatic control mode.

The need for recovery is determined by examining the process variable amplitude $a_1$. If the magnitude of $a_1$ is greater than three percent of full scale, it is assumed that a system upset has occurred. Upon finding $a_2$, the decay ratio and period of oscillation are computed. If the decay ratio $d \leq 0.15$ no corrective action is taken. If, however, $d > 0.15$, a nominal period of oscillation, $p_c$, is calculated as:

$$p_c = m\, dt$$

where m is the horizon window and dt is the controller sample time. If the condition, p is greater than $(1.5/60) p_c$, the model generated by the identifier has underestimated the true system dynamics. As a result, the predictor exhibits too much phase lag and corrective action must be taken. In this case, a temporary model is generated numerically using time constants and gain defined as:

$$\tau_1 = (0.88/60) p$$

$$\tau_2 = (0.20/60) p$$

$G$ = current model gain and a new horizon window is calculated as:

$$m = m_d + (5/60) p,$$

where $m_d$ is the design horizon window determined by the tuner. This will provide a more accurate model of the plant and reduce the control action. As a result, the closed loop system becomes more stable.

If, p is less than or equal to $(1.5/60) p_c$, then the model generated by the identifier is considered adequate and a new model is not computed. However, the horizon window is adjusted according to:

$$m = m_d + (7.5/60) p_c$$

to limit control action, thus dampening system response and stabilizing the closed loop system.

In the special case where the amplitude damping ratio is found to be in the range of $0.9 \leq d \leq 1.1$, a new horizon window is computed and the process variable is further observed for oscillations. If the oscillations persist, a new damping ratio and period of oscillation are computed and compared with those previously computed. If the damping ratios are of like value and the period of oscillation has increased, the horizon window is returned to its design value, $m_d$. This is considered an indication of actuator hysterias whose effect cannot be removed from the system response.

If the damping ratio is found to be greater than 1.1, the horizon window is extended to be $m = 2 m_d$. If oscillations in the process variable still exist, then the controller is switched into manual control mode and a retune is executed after the process variable reaches steady state. Note that all constants incorporated in the tuner are based on experience, other values could also be used.

CONTROL AND PREDICTION CALCULATORS

Figure 5:
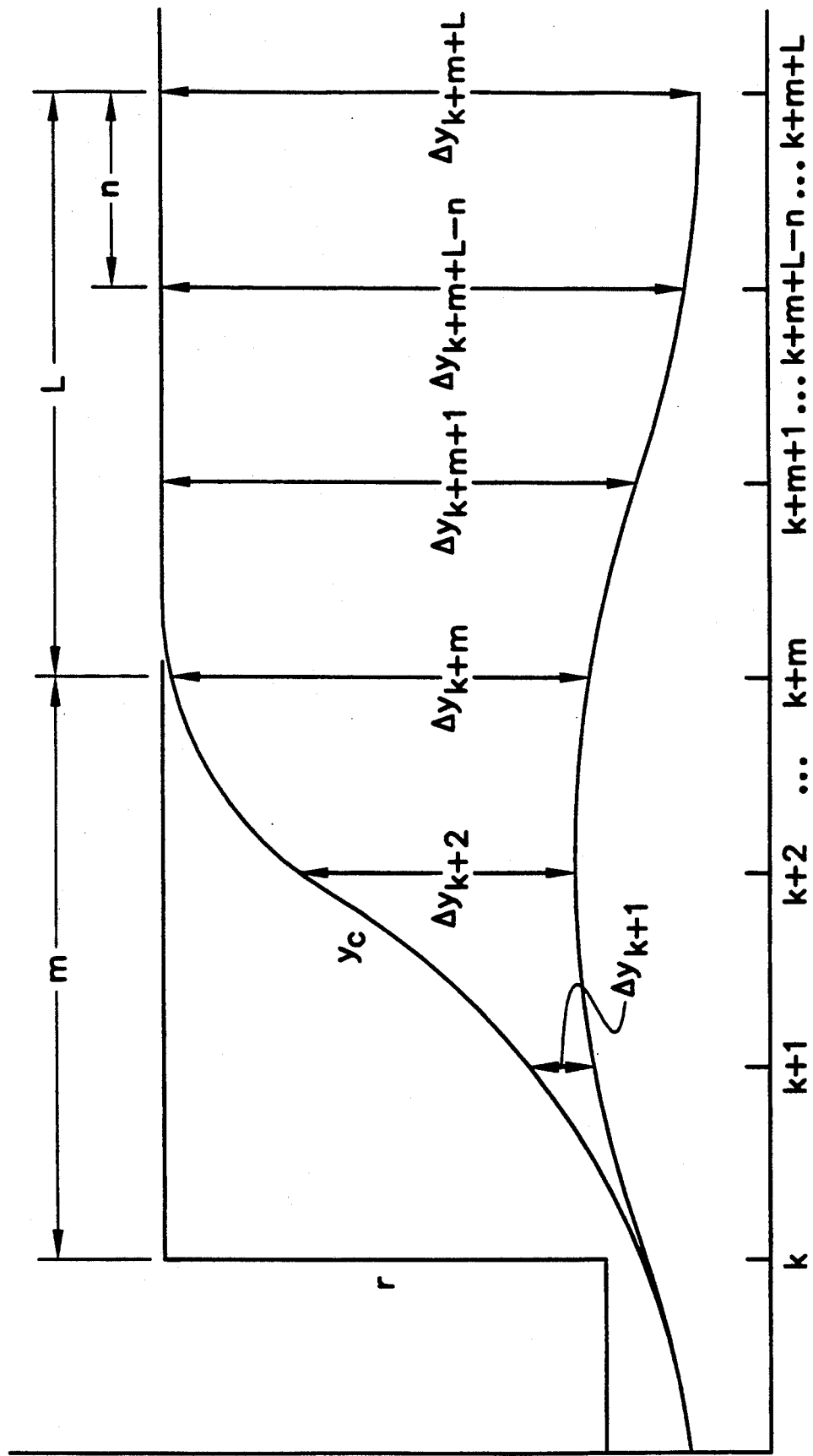
FIG. 5 is a graph of two response trajectories, illustrating the horizon concept for a SISO process for use in deriving the fundamental control law.

Fundamental servo-regulatory control is provided by calculations based on a finite horizon. The length of the control sequence for each manipulated variable is given by the horizon window. The receding horizon form utilizes only the first element in this sequence at each control step. The discrete-time finite horizon strategy for a SISO process is depicted graphically in FIG. 5. The parameter m is the desired number of control moves necessary to bring the process to set point. If m is the only parameter stipulated, then the process will be free to take on any value after m control moves. To reduce this possibility, the output can be constrained to remain at the set point for l additional control moves. This however does not guarantee that the process will remain at the set point, since it is entirely possible to satisfy these criteria at discrete points in time and still have intersample oscillations. To circumvent this problem, the controller allows constraints to be imposed on the control moves during the last n intervals. The relative positions of m, l, and n are shown in FIG. 5, where r defines the set-point input by the user. The control algorithm to accomplish this is described below.

Functionally the control calculator is composed of two distinct parts. The first is a model-based predictor, whose function is to predict the process output trajectory that would occur if no future chances are made to the controller output ($y^n$). A model-based corrector forms the second part of the controller, whose function is to specify the future changes in the controller output that will be necessary to achieve the desired output trajectory ($y^c$).

The process being controlled is represented mathematically by the following incremental model in discrete time form:

$$A(z^{-1})\delta y_k = B(z^{-1})\delta u_k + C(z^{-1})\delta w_k + \delta \zeta_k \quad (1)$$

where the symbols $z^{-1}$ and $\delta$ are the backward shift operator (i.e. $y_k z^{-1} = y_{k-1}$) and the difference operator (i.e. $\delta y_k = y_k - y_{k-1}$) respectively. The y, u, w, and $\zeta$ vectors at time k are composed of ny process outputs, nu controller outputs, nw measurable disturbances, and ny measurement noise elements respectively. The $i^{th}$ element of the diagonal A matrix and the $j^{th}$ element of the B and C matrices corresponding to the $i^{th}$ process output are given by:

$$a^i(z^{-1}) = 1 + a_1^i z^{-1} + \ldots + a_{n(i)}^i z^{-n(i)}$$

$$b^{ij}(z^{-1}) = b_1^{ij} z^{-1} + b_2^{ij} z^{-2} + \ldots + b_{m(j)}^{ij} z^{-m(j)}$$

$$c^{ij}(z^{-1}) = c_0^{ij} + c_1^{ij} z^{-1} + \ldots + c_{l(j)}^{ij} z^{-l(j)}$$

where n(i) is the denominator order of the $i^{th}$ output, m(j) is the numerator order of the $j^{th}$ input corresponding to the $i^{th}$ output, and l(j) is the numerator order of the $j^{th}$ measurable disturbance corresponding to the $i^{th}$ output. With these definitions the prediction model for the $i^{th}$ output becomes:

$$\delta y_{kp}^i = \psi_k^{iT} \theta_{k-1}^i \quad (2)$$

where $$\psi_k^{iT} = [-\delta y_{k-1}^i \ldots -\delta y_{k-n(i)}^i; \delta u_{k-1}^1 \ldots \delta u_{k-m(1)}^1; \ldots; \delta u_{k-1}^{nu} \ldots \delta u_{k-m(nu)}^{nu}; \delta w_k^1 \ldots \delta w_{k-l(1)}^1; \delta w_k^2 \ldots \delta w_{k-l(2)}^2; \ldots; \delta w_k^{nw} \ldots \delta w_{k-l(nw)}^{nw}]$$

and $$\theta_{k-1}^i = [\hat{a}_1^i \ldots \hat{a}_{n(i)}^i; \hat{b}_1^{i,1} \ldots \hat{b}_{m(1)}^{i,1}; \ldots; \hat{b}_1^{i,nu} \ldots \hat{b}_{m(nu)}^{i,nu}; \hat{c}_0^{i,1} \ldots \hat{c}_{l(1)}^{i,1}; \hat{c}_0^{i,2} \ldots \hat{c}_{l(2)}^{i,2}; \ldots; \hat{c}_0^{i,nw} \ldots \hat{c}_{l(nw)}^{i,nw}]^T$$

Due to the nature of sampled data systems, the general form of the model given above allows for the possibility that a measured disturbance at time k can already have an effect on the output at time k. This is the reason for the $c_0$ term in the model. If this is not the case then $c_0$ will simply be zero. Evaluation of the unknown model coefficients for each process output is accomplished by a recursive least squares (RLS) estimate.

To generate the process trajectory, the predictor calculation means uses Equation (2) in a recursive fashion. The $y^n$ trajectory for each output is given at $k+1$ and beyond by specifying that the inputs at k and beyond are equal to the inputs at $k-1$. This implies that $\delta u_k^j = u_k^j - u_{k-1}^j = 0$, $\delta u_{k+1}^j = u_{k+1}^j - u_k^j = 0$, etc. In addition the disturbances at $k+1$ and beyond are taken to be equal to the measured value at k. This implies that $\delta w_{k+1}^j = w_{k+1}^j - w_k^j = 0$, etc. Therefore the projection of the $i^{th}$ output at the first step is given by:

$$\delta y_{k+1}^i = -a_1^i \delta y_k^i \ldots -a_{n(i)}^i \delta_{k-n(i)+1}^i \quad (3)$$
$$+ b_1^{i,1} 0 + b_2^{i,1} \delta u_{k-1} + b_3^{i,1} \delta u_{k-2} \ldots + b_{m(1)}^{i,1} \delta u_{k-m(1)+1}^1$$

$$+ b_1^{i,nu} 0 + b_2^{i,nu} \delta u_{k-1}^{nu} + b_3^{i,nu} \delta u_{k-2}^{nu} \ldots + b_{m(nu)}^{i,nu} \delta u_{k-m(nu)+1}^{nu}$$
$$+ c_0^{i,1} 0 + c_1^{i,1} \delta w_k^1 + c_2^{i,1} \delta w_{k-1}^1 \ldots + c_{l(1)}^{i,1} \delta w_{k-l(1)+1}^1$$

$$+ c_0^{i,nw} 0 + c_1^{i,nw} \delta w_k^{nw} + c_2^{i,nw} \delta w_{k-1}^{nw} \ldots + c_{l(nw)}^{i,nw} \delta w_{k-l(nw)+1}^{nw}$$

$$y_{k+1}^i = y_k^n + \delta y_{k+1}^i \quad (4)$$

at the next step the projection is given by:

$$\delta y_{k+2}^i = -a_1^i \delta y_{k+1}^i \ldots -a_{n(i)}^i \delta y_{k-n(i)+2}^i$$
$$+ b_1^{i,1} 0 + b_2^{i,1} 0 + b_3^{i,1} \delta u_{k-1} \ldots + b_{m(1)}^{i,1} \delta u_{k-m(1)+1}^2$$

$$+ b_1^{i,nu} 0 + b_2^{i,nu} 0 + b_3^{i,nu} \delta u_{k-1}^{nu} \ldots + b_{m(nu)}^{i,nu} \delta u_{k-m(nu)+2}^{nu}$$
$$+ c_0^{i,1} 0 + c_1^{i,1} 0 + c_2^{i,1} \delta w_k^1 \ldots + c_{l(1)}^{i,1} \delta w_{k-l(1)+2}^1$$

$$+ c_0^{i,nw} 0 + c_1^{i,nw} 0 + c_2^{i,nw} \delta w_k^1 \ldots + c_{l(nw)}^{i,nw} \delta w_{k-l(nw)+2}^{nw}$$

$$y_{k+2}^i = y_{k+1}^i + \delta y_{k+2}^i$$

The procedure is repeated until the projection for the horizon window is complete (from $k+1$ through $k+m+1$). Feedback necessary to react to persistent unmeasured disturbances is accomplished by setting the term $y_k^n$ in Equation(4) to the measured value of the process output at the current time. Initialization for all but the $k^{th}$ terms is accomplished by backshifting each of the stored incremental variables starting with the oldest value (i.e. $\delta y_{k-n+1} = \delta y_{k-n+2}$, etc.). The $k^{th}$ value of $\delta y$ is set to the difference between the measured value of y at the current and previous control steps. This formulation allows the controller to react to set-point and load changes in a similar fashion. Put in more general terms, the method of predection may be nominal or augmented. To explain this a hypothetical single-input single-output (SISO) process is used, representing a third-order, open-loop, unstable system with nonminimum phase characteristics and transport delay. Its transfer function is given by:

$T(s) = 6(1 - 0.4s)e^{-0.5s}/(0.2s + 1)(s^2 - 0.4s + 4)$. Assuming a sample rate of 0.5 units of time, the identifier will be able to extract an effective model from step response data of such a system after 20 samples (or more if desired). The following discussion regarding prediction uses this hypothetical system and is plotted out in FIG. 18.

With augmented predection, dead-beat behavior is possible where l and n are selected as follows:

$l = o$, and $n = o + d - 1$, where o is the order of the system and d is the pure transport delay in integer multiples of the sample rate. That is, it is possible to bring the system being controlled completely to rest in precisely m control steps, where m is the desired settling time in integer multiples of the sample rate. Time-optimal ripple-free response is obtained where m is selected as: $m = o + d$.

Figure 18:
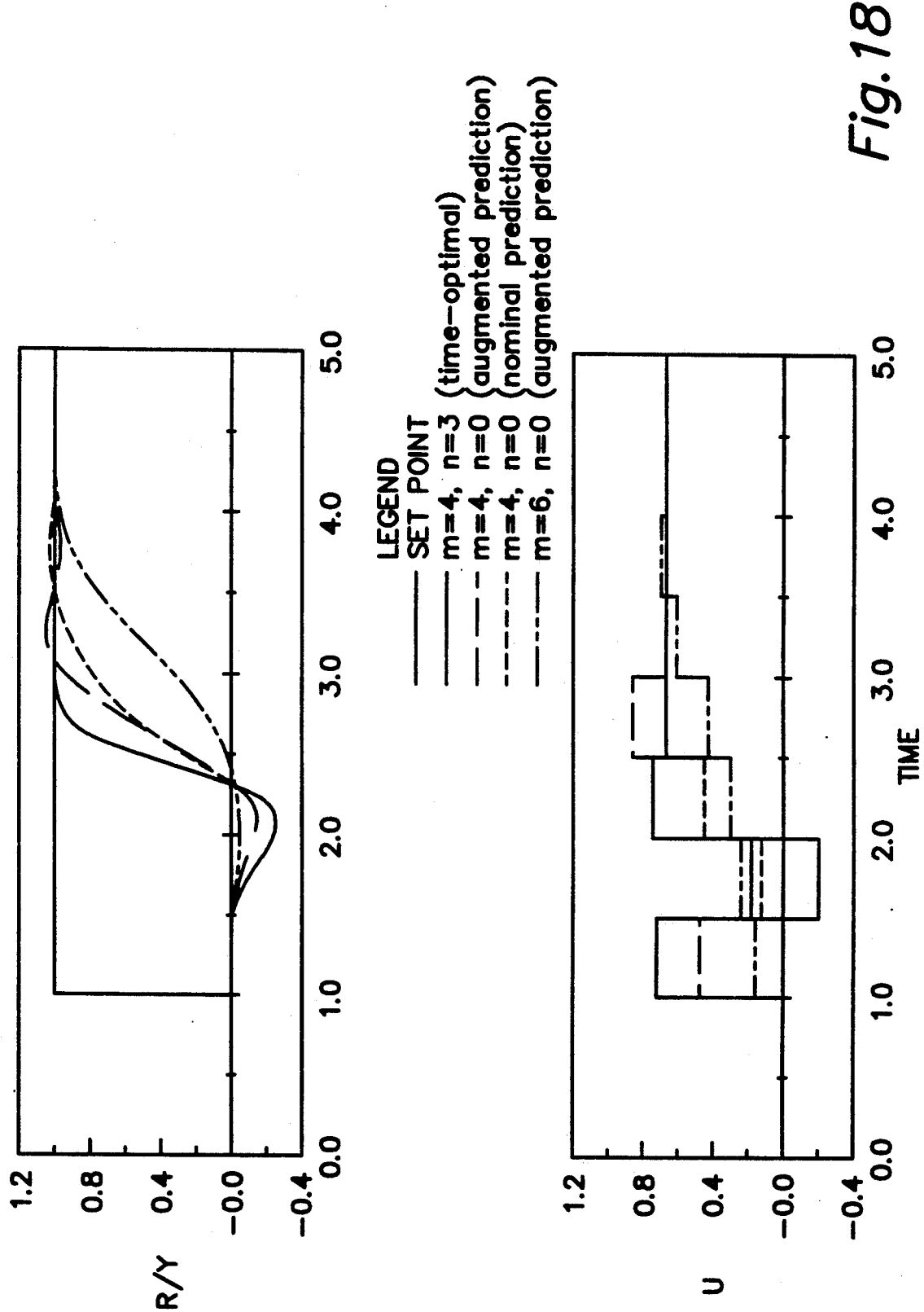
FIG. 18 is a paired set of line charts, showing the effect on m and n on control performance where $l=3$.

The effect of m and n on control performance for both nominal and augmented prediction is shown in FIG. 18. In this FIG. 1 is held constant at 3. Time-optimal control is possible only with $n = 3$. Without control constraints ($n = 0$), performance is still quite good in all cases. It can be seen that with augmented prediction and $m = 4$ the error is driven to zero by $t = 3$; however the system is not brought to rest and some overshoot is observed. Nominal prediction causes less overshoot than the augmented kind but is slightly more sluggish.

Figure 19:
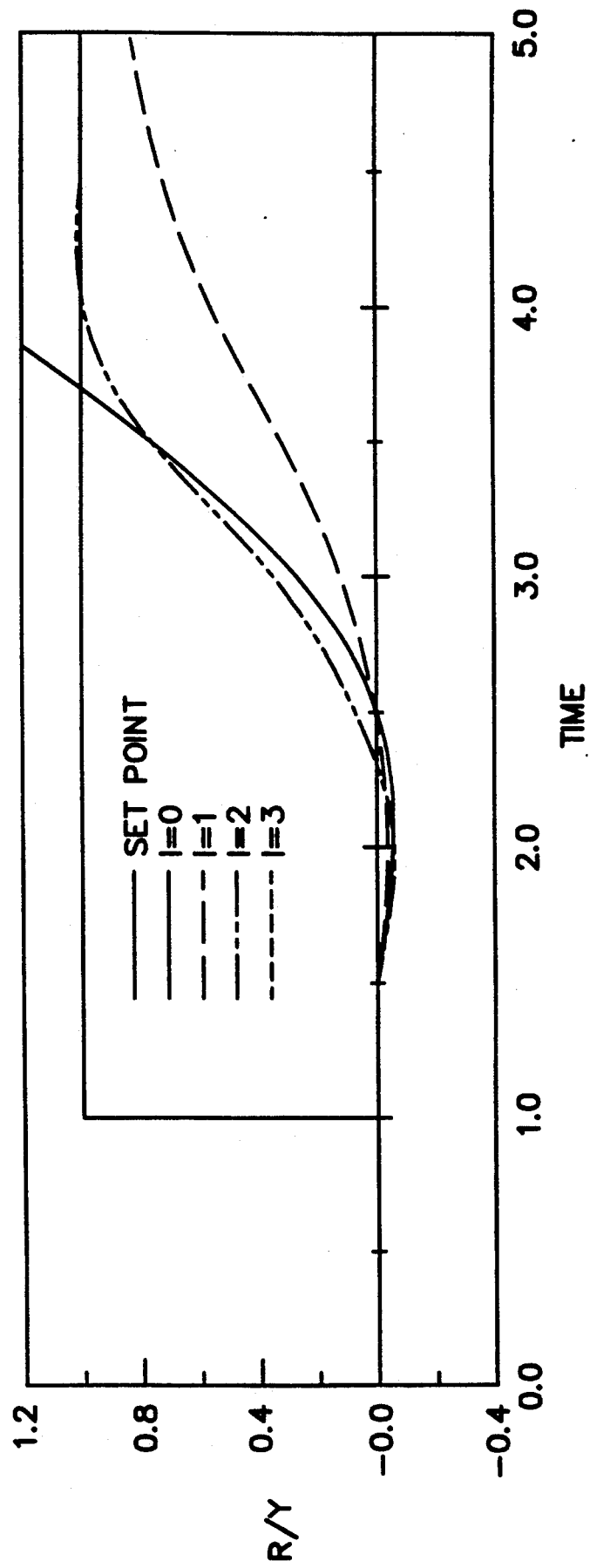
FIG. 19 is a line chart showing the effect of l on control performance (augmented prediction, $m=6$, $n=0$).

With augmented prediction and m=6, the error is driven to zero by t=4 as desired with virtually no overshoot. In general augmented prediction will result in settling times using this invention at or near the user specified value, even with n=0. It is however more prone to overshoot than nominal prediction when m is close to its time-optimal value or when there are model errors. In addition it is less robust than nominal prediction for equivalent controller tuning. With nominal prediction the actual settling times are longer than that specified by m. Also, unlike with n, as l approaches zero, control performance can be seen to degrade substantially especially for small values of m. The effect of l on control performance is shown in FIG. 19. Performance improves rapidly as l is increased. In general, the effect of l on control performance is greatly diminished for l greater than 2 or 3 even for higher order systems. This is particularly true as m is increased.

To formulate the control law, it is necessary to define the functional relationship between the correction sequence, $\Delta y_{k+m}$ to $\Delta y_{k+m+l}$, and the control sequence, $\Delta u_k$ to $\Delta u_{k+m+l-1}$, for each output and input. To accomplish this a unit response model is utilized. This model has the form:

$$\Delta y_n^i = f_n^{i,1} \Delta u_0^1 + f_n^{i,2} \Delta u_0^2 \ldots f_n^{i,j} \Delta u_0^j \ldots f_n^{i,nu} \Delta u_0^{nu} \quad (5)$$

where superscripts refer to the $i^{th}$ and $j^{th}$ process output and input respectively and $\Delta y_n$ is equal to the change in the process output at sample time n relative to y at the beginning of the step change in u, $f_n$ is equal to the $n^{th}$ unit response factor, and $\Delta u_0^j$ is equal to the change in $u^j$. Hence, the $f_i$'s are simply the discrete values of the process output taken from the unit response curve. These values are given from the impulse response coefficients which can be determined directly from the internal ARMA model.

Equation (5) can be used in a repeated fashion at each control interval to obtain the desired functional relationship between the $\Delta y$'s and the $\Delta u$'s. The relationship is given by:

$$F \Delta u = \Delta y \quad (6)$$

where:
$$\Delta y = [\Delta y_{k+m}^1 \ldots \Delta y_{k+m+l}^1; \Delta y_{k+m}^2 \ldots \Delta y_{k+m+l}^2; \ldots; \Delta y_{k+m}^{ny} \ldots \Delta y_{k+m+l}^{ny}]^T$$

$$\Delta u = [\Delta u_{k+1}^1 \ldots \Delta u_{k+m+l-1}^1; \Delta u_{k+1}^2 \ldots \Delta u_{k+m+l-1}^2; \ldots; \Delta u_{k+1}^{nu} \ldots \Delta u_{k+m+l-1}^{nu}]^T$$

and $$F = \begin{bmatrix} F^{1,1} & F^{1,2} & \ldots & F^{1,nu} \\ F^{2,1} & & & \\ \vdots & & \ddots & \\ F^{ny,1} & F^{ny,2} & \ldots & F^{ny,nu} \end{bmatrix}$$

Each of the F submatrices are given in terms of the unit response factors used in Equation (5). These submatrices are given by:

$$F^{i,j} = \begin{bmatrix} f_m^{ij} & f_{m-1}^{ij} & \ldots & f_1^{ij} & 0 & 0 & 0 & \ldots & 0 \\ f_{m+1}^{ij} & f_m^{ij} & \ldots & f_2^{ij} & f_1^{ij} & 0 & 0 & \ldots & 0 \\ f_{m+2}^{ij} & f_{m+1}^{ij} & \ldots & f_3^{ij} & f_2^{ij} & f_1^{ij} & & \ldots & 0 \\ \vdots & & & & & & \ddots & & \\ f_{m+l-1}^{ij} & f_{m+l-2}^{ij} & & & & f_3^{ij} & f_2^{ij} & & 0 \\ f_{m+l}^{ij} & f_{m+l-1}^{ij} & & & & f_3^{ij} & f_2^{ij} & & f_1^{ij} \end{bmatrix}$$

It is also necessary to define the relationship between the prescribed and actual values of $\Delta u$. Referring back to FIG. 5, it can be seen that the last n elements of the control sequence are prescribed. Therefore, the general relation can be written as:

$$N \Delta u = \beta \quad (7)$$

where;

$$N = \begin{bmatrix} N^1 & 0 & \ldots & 0 \\ 0 & N^2 & & \vdots \\ \vdots & & \ddots & \\ \vdots & & & 0 \\ 0 & \ldots & 0 & N^{nu} \end{bmatrix}$$

The diagonal submatrices are of the form:

$$N^j = \begin{bmatrix} 0 & 0 & 0 & \ldots & 1 & 0 & 0 & \ldots & 0 \\ 0 & 0 & 0 & \ldots & 0 & 1 & 0 & \ldots & 0 \\ \vdots & & & \ldots & & & & & \vdots \\ \vdots & & & \ldots & & & & & \vdots \\ 0 & 0 & 0 & \ldots & 0 & 0 & 0 & 1 & 0 \\ 0 & 0 & 0 & \ldots & 0 & 0 & 0 & 0 & 1 \end{bmatrix}$$

and $$\beta = [\beta_1^1 \ldots \beta_{n(1)}^1; \beta_1^2 \ldots \beta_{n(2)}^2; \ldots; \beta_1^{nu} \ldots \beta_{n(nu)}^{nu}]^T$$

Two constraint relations are required for the control law formulation. Since the constraints are imposed only at the end of the horizon, the maximum length of the constraint vector is $l+1$. The constraints on the process outputs are given in terms of the error vector which is defined as the difference between the set point and the corrected process output. Since the corrected process output is equal to the nominal output plus the $\Delta y$ correction defined by Equation (6), the error vector at m and beyond is given by:

$$e = e^n - F \Delta u \quad (8)$$

where $e^n$ is the difference between the set point and the nominal process output.

It is also convenient to cast the constraints on the controller outputs in a similar error form. Here, the error vector, $\mu$, can be thought of as the discrepancy between the prescribed, $\beta$, and actual, $N \Delta u$, values of the controller output. Thus the controller constraint equation becomes:

$$\mu = \beta - N\Delta u \quad (9)$$

With these definitions, the control law is obtained by solving the following problem:

$$\begin{aligned} \text{Minimize:} \quad & J = \Delta u^T \Delta u \\ \text{Subject to:} \quad & e = 0 \\ & \mu = 0 \end{aligned}$$

This problem is solved by adjoining both vector constraints to the cost function J by means of two sets of Lagrangian multipliers. The resulting Hamiltonian is defined by the expression:

$$H = J + \lambda^T e + \phi^T \mu \quad (10)$$

The necessary conditions for the minimization of the Hamiltonian are:

$$\frac{\partial H}{\partial \lambda} = 0; \quad \frac{\partial H}{\partial \phi} = 0; \quad \frac{\partial H}{\partial \Delta u} = 0$$

Using Equations (8) and (9), the derivatives in the first two necessary conditions become:

$$\frac{\partial (J + \lambda^T e + \phi^T \mu)}{\partial \lambda} = e^n - F\Delta u$$

$$\frac{\partial (J + \lambda^T e + \phi^T \mu)}{\partial \phi} = \eta - N\Delta u$$

Imposing the first two necessary conditions insures that the constraints will be satisfied. Since it is required that the constraints be equal to zero, the value of $\Delta u$ that minimizes the Hamiltonian will be the same value of $\Delta u$ that minimizes the cost function J. If the explicit dependence of the Hamiltonian on $\Delta u$ is accounted for, then the derivative in the final necessary condition becomes:

$$\frac{\partial H}{\partial \Delta u} = \frac{\partial \Delta u^T \Delta u}{\partial \Delta u} + \frac{\partial \lambda^T (e^n - F\Delta u)}{\partial \Delta u} + \frac{\partial \phi^T (\eta - N\Delta u)}{\partial \Delta u}$$

The first term on the right hand side of the above expression can be written as:

$$\frac{\partial \Delta u^T \Delta u}{\partial \Delta u} = 2\Delta u$$

In the second term the nominal error is a constant thus:

$$\frac{\partial \lambda^T (e^n - F\Delta u)}{\partial \Delta u} = \frac{\partial \lambda^T F\Delta u}{\partial \Delta u} = -\frac{\partial (F^T \lambda)^T \Delta u}{\partial \Delta u} = -F^T \lambda$$

Similarly for the last term:

$$\frac{\partial \phi^T (\eta - N\Delta u)}{\partial \Delta u} = -\frac{\partial (N^T \phi)^T \Delta u}{\partial \Delta u} = -N^T \phi$$

Therefore, to minimize J subject to the constraints, the following expressions must be satisfied:

$$2\Delta u - F^T \lambda - N^T \phi = 0 \quad (11)$$

$$e^n - F\Delta u = 0 \quad (12)$$

$$\eta - N\Delta u = 0 \quad (13)$$

Equations (11) through (13) can be solved simultaneously to obtain the two Lagrangian multipliers and the optimal control vector. The solution for the control vector is:

$$\Delta u = Ge^n - b \quad (14)$$

where:

$$G = [F^T - N^T N F^T] E (FF^T)^{-1}$$

$$E = [I - (FF^T)^{-1} F N^T N F^T]^{-1}$$

$$b = [GFN^T - N^T]\beta$$

Figure 6A:
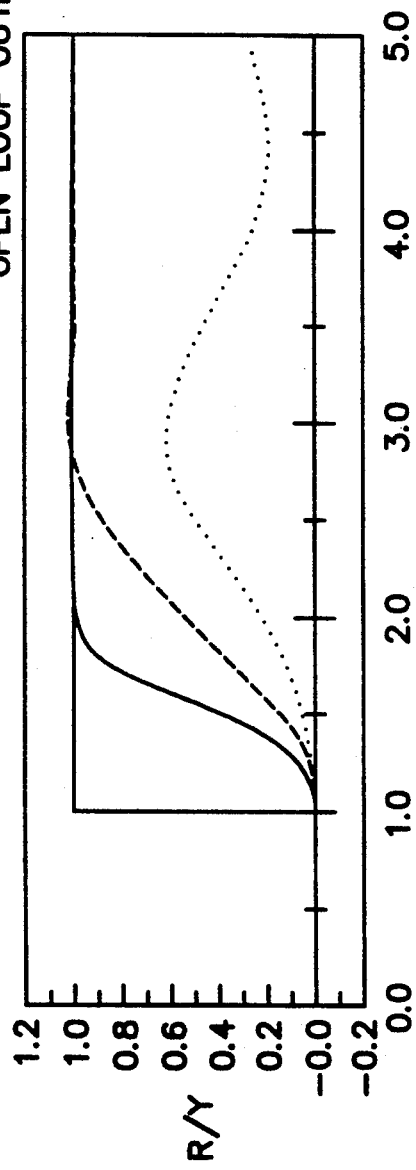
FIGS. 6a and 6b are graphs of the response variable and the manipulated variable, respectively, showing typical receding horizon performance for a highly underdamped SISO (Single Input, Single Output) process.
Figure 6B:
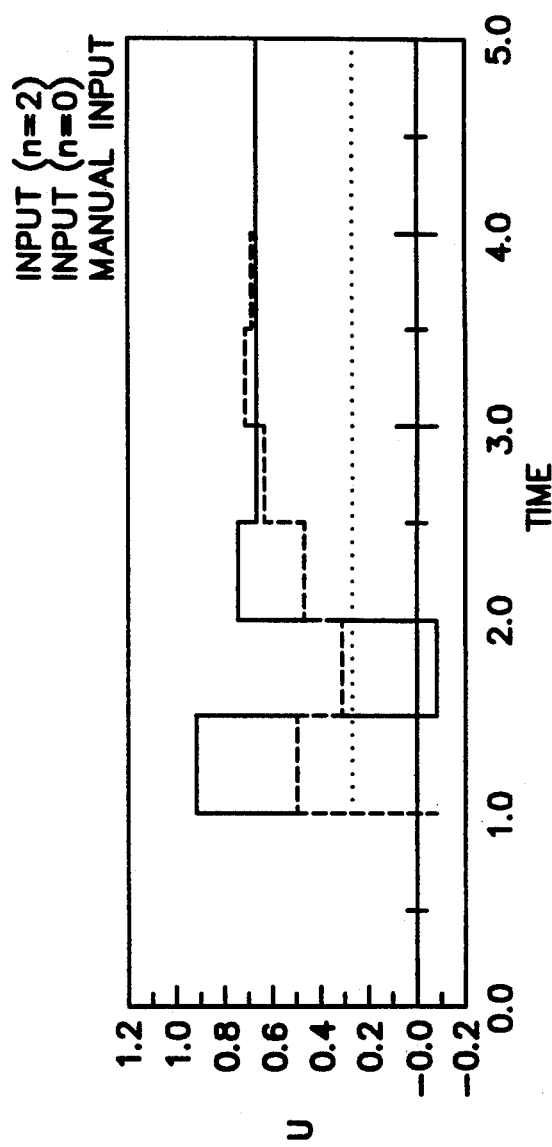

Typical servo performance of the receding horizon algorithm is illustrated in FIGS. 6a and 6b for a SISO process. A third order underdamped system is assumed (the gain, time constant, damping ratio, and undamped natural frequency are 1.5, 0.2, 0.10, and 2 respectively). The open loop characteristics of this process can be seen by the dotted line. For closed loop response the horizon has been defined by selecting m=3, l=2 and $\beta=0$. Performance is illustrated for n=2 (control movement is constrained to zero during the last two intervals of the horizon) and for n=0 (no controller constraints). Dead beat response is exhibited for n=2. The process is brought exactly to rest after m control moves and there is zero overshoot. Without control constraints, true dead beat performance is not attainable. With n=0 it takes slightly longer to eliminate the error than the desired m, and there is small amount of overshoot (approximately 1.8 percent).

OPTIMIZER CALCULATOR

It is necessary to specify the time history of each manipulated variable such that each controlled variable has the desired response and such that the costs associated with the control trajectories are minimized. For this class of problem it is assumed that there are more manipulated than controlled variables. Unfortunately, the form of the control law defined by Equation (14) does not directly support excess manipulated variables nor does it accommodate nonlinear minimization. To deal with this problem the extra or 'free' manipulated variables are determined by solving an on-line auxiliary cost minimization problem. The control law is used as a constraint in this auxiliary problem to insure proper servo-regulatory response.

To establish the coupling between the cost problem and the control problem, the free variables are treated as pseudo measurable disturbances and the feedforward capabilities of the controller are invoked. Feedforward compensation is a natural result of the prediction model given by Equation (2). The future effect of a pseudo measurable disturbance over the horizon is automatically accounted for in the computation of $y^n$ given by Equation (4). Thus, pseudo measurable disturbances appear implicitly in $e^n$ and are dealt with directly in the calculation of $\Delta u$ given by Equation (14). This implies that for a given value of the free variables, the manipulated variables will be adjusted appropriately to insure that the linear constrained optimization problem used to define Equation (14) is satisfied.

To evaluate the free variables it is assumed that the total operating cost is given by the general function:

$$c = f(u, w^*) \tag{15}$$

where $w^*$ is the vector of free inputs that are treated as pseudo-measurable disturbances. The auxiliary optimization problem is stated as follows:

Minimize: $c = f(u, w^*)$

Subject to: $\Delta u - (Ge^n - b) = 0$

Since locally, $e^n$ is a function of $w^*$, $\Delta u$ and $u$ are as well. Therefore the free variables can be determined from the following necessary conditions:

$$\frac{\partial c}{\partial w^*} = 0 \tag{16}$$

$$\Delta u - (Ge^n - b) = 0 \tag{17}$$

Solution of Equations (16) and (17) implies that servo-regulatory performance is not compromised in spite of the minimization. For general cost functions, a closed form solution is not possible. Hence, an iterative technique is employed. The solution strategy used in the preferred embodiment utilizes a multi-dimensional second order gradient search defined by the following iterative relationship:

$$w_{i+1}^* = w_i^* - J^{-1} r \tag{18}$$

In Equation (18) the residual vector r, and the Jacobian matrix J, are defined as:

$$r_j = \frac{\partial c}{\partial w_j^*}$$

$$J_{j,k} = \frac{\partial r_j}{\partial w_k^*}$$

These derivatives are evaluated numerically in the process of the search. The subscript i refers to the iteration within the control interval and the subscripts j and k refer to specific elements of the vector of free inputs w. For quadratic cost functions the optimization problem is linear, thus Equation (18) will yield a direct solution and no iterations are required.

To further explain the cost minimization calculation a description relative to the exemplary heat pump application cited previously will be given. In the heat pump application there are three manipulated variables; compressor speed, blower speed and superheat setting and one controlled variable, comfort. Therefore there are two free variables. For discussion purposes it will be assumed that the blower speed and superheat setting are the free variables. If no optimization were to be preformed then these variables would be held constant and the controller will simply adjust compressor speed to insure that comfort tracks the set-point as the load or set-point is varied. Now if costs are to be minimized the optimizer will determine the optimum blend of all three manipulated variables. To accomplish this it will first guess a new value for blower speed. It will use the internal model to predict the effect that this change will have on the comfort. It will then use the receding horizon control computation to determine the compressor speed necessary to insure that the comfort level tracks the set-point. Next it will make the same type of guess and calculation for the superheat setting. When these computations are complete it will determine the cost of operation over the horizon window for this set of manipulated variables. The costs are determined either by user supplied cost functions (as given for example by Equation (20)) or by recorded efficiency or cost data if it is available. The optimizer then repeats the procedure with another guess. Form these two guess (on each of the free variables) the optimizer calculates the appropriate derivatives numerically, as described above, and uses the search defined by Equation (18) to determine the values of the manipulated variables that result in cost minimized performance. These values are then converted to output signals to affect the desired response. The process is repeated at each control step.

An example of typical performance of this controller is shown in FIGS. 8 through 14. The process to be controlled has the following form:

$$y = H(s)u \tag{19}$$

The output and input vectors respectively are given by:

$$y = [y_1, y_2]^T$$

$$u = [u_1, u_2, u_3, u_4]^T$$

The control law specifies $u_1$ through $u_4$, with the last two inputs defined as the free variables (i.e. $u_3 = w_1$ and $u_4 = w_2$).

The free variables are treated as pseudo-measurable disturbances and are determined as described previously by utilizing the feedforward capability of the controller. To determine the cost optimal control sequence it is necessary to assign a cost of operation to each manipulated variable. The solution strategy is independent of the form of this cost function. The cost function used to demonstrate the performance of the new controller for the $j^{th}$ controller output is given by a third order polynomial of the form:

$$c_j = \sum_{i=0}^{3} a_i u_j^i \tag{20}$$

The controller output u at any time k during the horizon window is given by:

$$u_k = u_0 + \sum_{i=1}^{k} \Delta u_i \tag{21}$$

where $u_0$ is the current value of the manipulated variable. Since the control law utilizes a finite horizon, a penalty term is imposed at the end of the window to insure that in the limit the free variables take on their optimal steady state values. The final values are computed based on the internal model used by the predictor.

Figure 7:
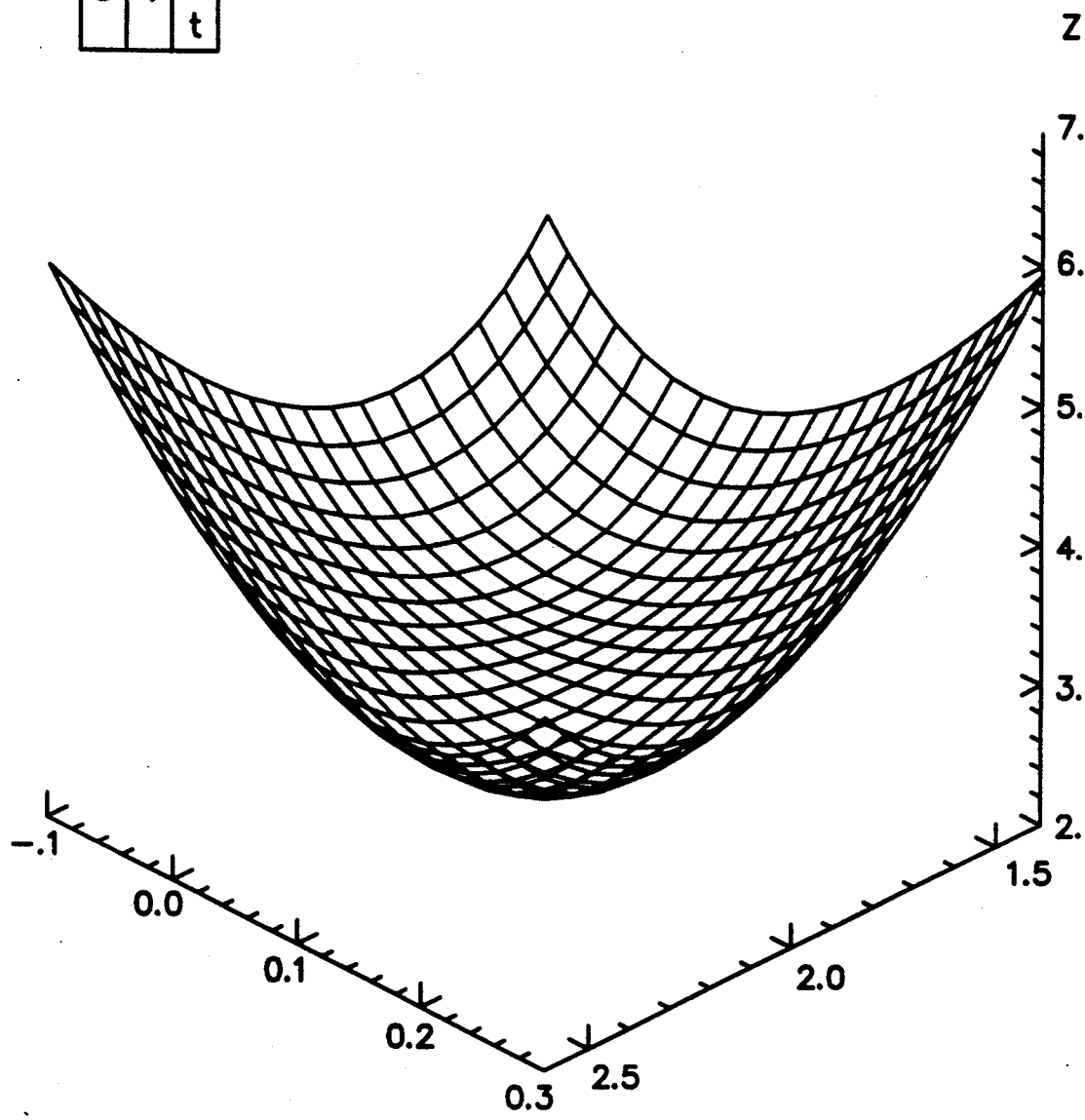
FIG. 7 is a graph of a steady state cost surface for a particular process.
Figure 8A:
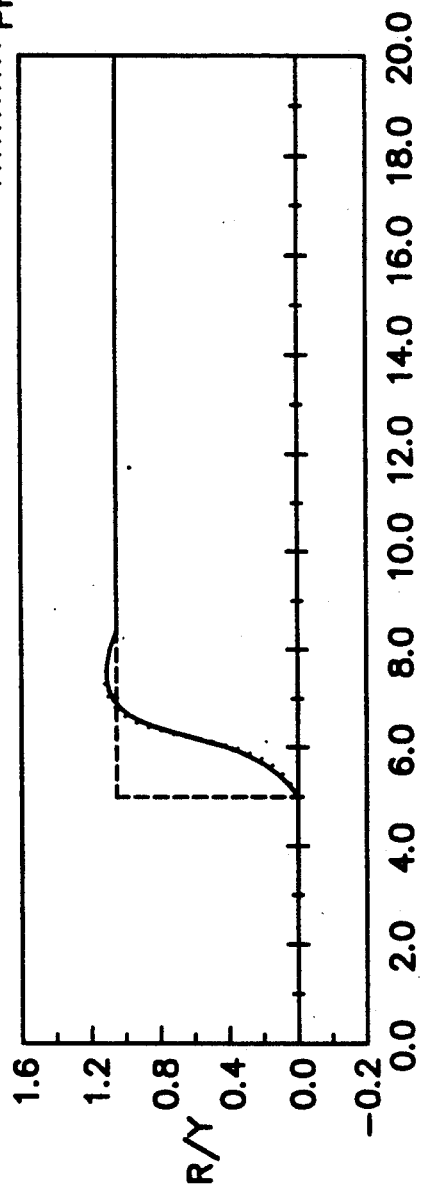
FIGS. 8a and 8b are graphs of the response and manipulated output variables, respectively, showing the servo-performance of the controller for set point response without cost minimization.
Figure 8B:
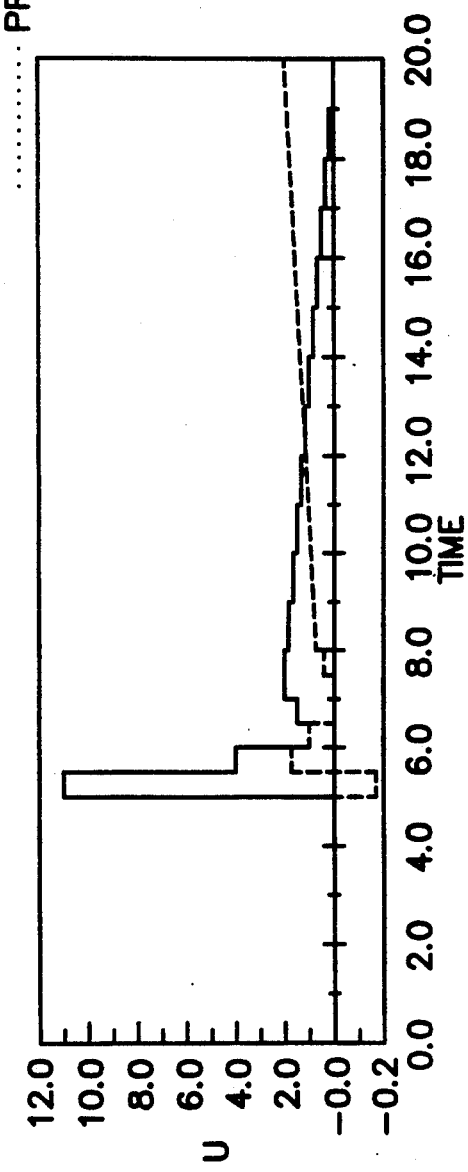

Servo performance will first be demonstrated for the case where both set-points are simultaneously changed from zero to one. The steady state cost surface for this example as a function of the free variables is shown in FIG. 7 for $y_1 = y_2 = 1$. The well defined minimum cost is located at $w_1 = 1.92$ and $w_2 = 0.07$. Since the cost functions are heavily weighted in favor of the free variables (i.e. $u_3$ and $u_4$ are inexpensive relative to $u_1$ and $u_2$), the cost minimization strategy will discourage the use of $u_1$ and $u_2$. The tuner and identifier are first used to establish a valid model as described previously. Once this is accomplished automatic control commences and the set-points are changed. Response of the system to the set-point change without cost minimization is illustrated in FIGS. 8a and 8b. While servo performance is as desired, considerable control effort is necessary as seen in the curves of FIG. 8b. This effort consumes expensive $u_1$ and $u_2$ resources. Since $w_1$ and $w_2$ are zero for this strategy, even at steady state unnecessary resources are consumed. This steady state consumption of unnecessary resources can be alleviated by setting $w_1$ and $w_2$ to their optimal values. Unfortunately the steady state values of the free inputs are not necessarily the correct values to use during transient response. That is, the steady state cost map does not generally apply as the states of the system evolve. The new cost minimization strategy taught here deals directly with this problem.

Servo performance of the cost minimization strategy is shown in FIGS. 9a and 9b in terms of both manipulated and controlled variables. The conditions stated for the previous figure apply here as well. Output response is virtually identical to the non-optimized case. The fundamental difference is the control specification. The most obvious change is the significant reduction in control effort at the onset of the transient. Inspection shows that most of the work is done by the relatively inexpensive $u_3$. Clearly, the steady state values of the free inputs are not appropriate, nor are they desirable during the transient. The free variables do, however, attain their optimal steady state values as equilibrium is approached.

Figure 10A:
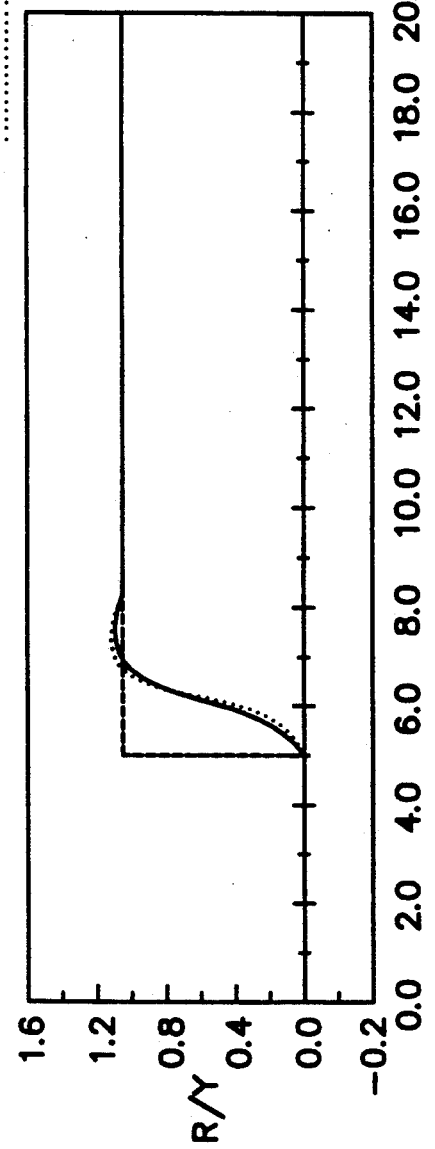
FIGS. 10a and 10b are graphs of the response and manipulated output variables, respectively, showing the servo-performance of the controller for set point response with steady state cost minimization.
Figure 10B:
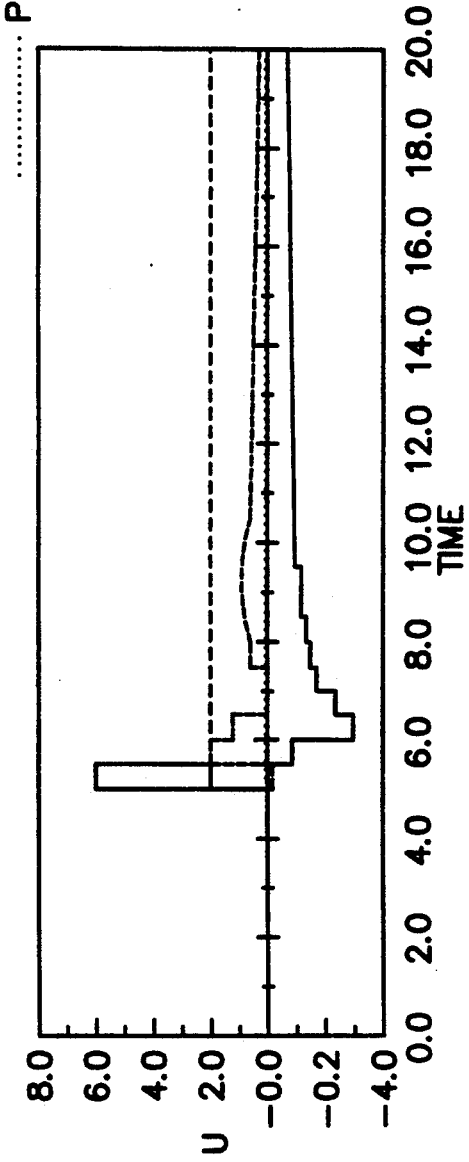

Response for the case with steady state optimization is shown in FIGS. 10a and 10b. Here the steady state optimal values for $u_3$ and $u_4$ are used from the onset of the transient. Although servo performance is the same as that given in the two previous figures, this approach uses considerably more of the expensive resources.

Figure 11A:
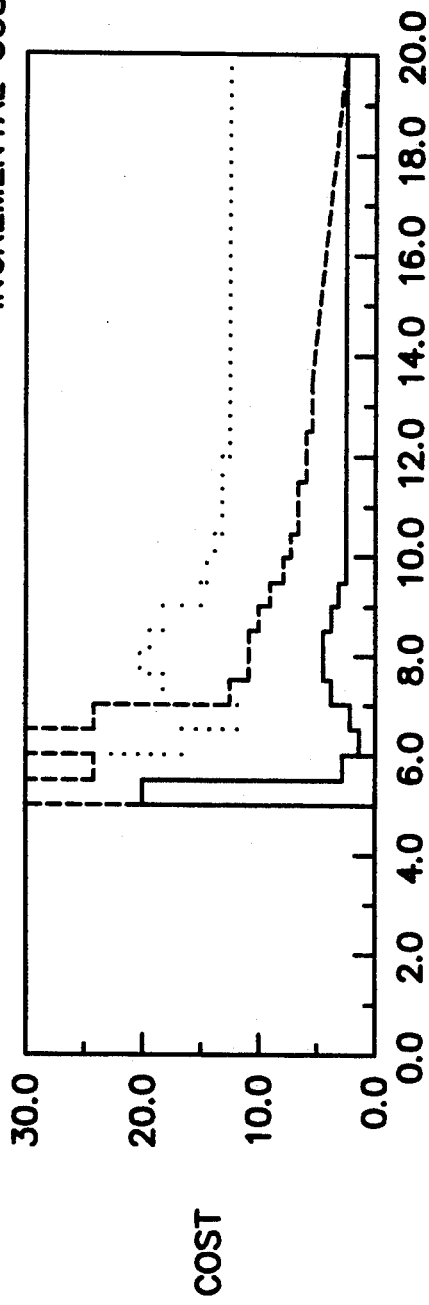
FIGS. 11a and 11b are graphs showing cost performance of the controller corresponding to the servo-performance illustrated in FIGS. 8a through 10b.
Figure 11B:
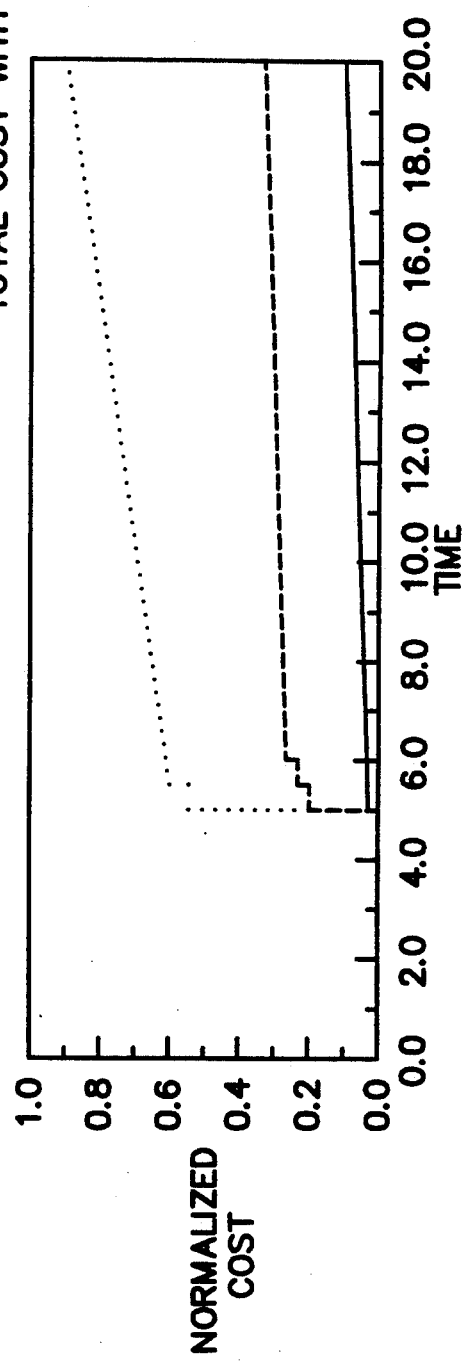

Cost performance associated with the previous three figures is presented in FIGS. 11a and 11b. FIG. 11a shows the costs at each control interval. FIG. 11b shows the integrated incremental costs. The highly desirable performance of the new control design is self evident. The effect of the judicious choice of control movement during the transient is clear. While a large reduction in operating costs relative to the base strategy is expected (since the base case uses expensive resources), the substantial reduction relative to the steady state optimal case represents a significant contribution of the new controller. Both optimization schemes approach the optimal steady state solution, however the dynamic scheme does so faster. As equilibrium is approached, the optimal solution offers a persistent cost reduction that is significant relative to the base case.

In the next figures, control and cost performance will be demonstrated for the case where there are both set-point changes and unmeasurable load disturbances. At $t=1$ the first and second set points are changed from zero to 0.5 and 1.0 respectively. At $t=10$ an unmeasurable disturbance with an initial amplitude of one and oscillatory characteristics is injected into the system. Servo-regulatory performance for the base case is depicted in FIGS. 12a and 12b. Servo response is seen to be very good. Regulatory behavior is adequate in spite of the magnitude and oscillatory nature of the disturbance. The control action is substantial and equilibrium conditions require a large value for the expensive resource (in this case $u_1$).

Figure 13A:
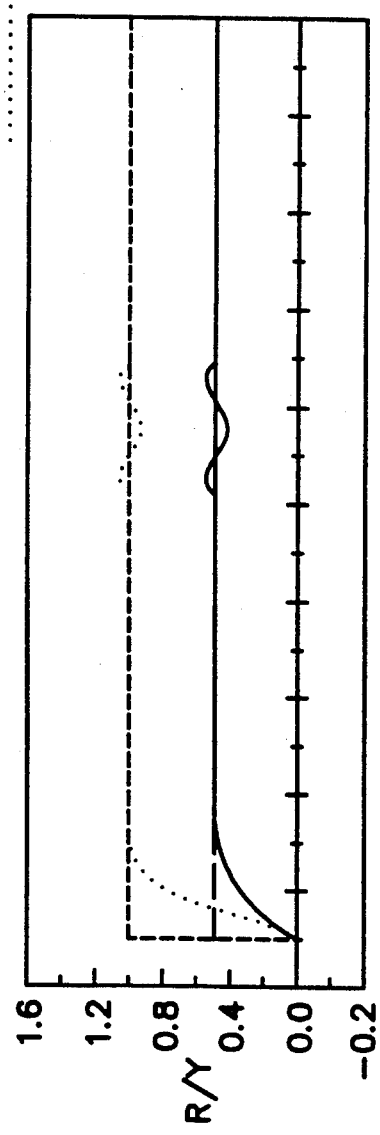
Figure 13B:
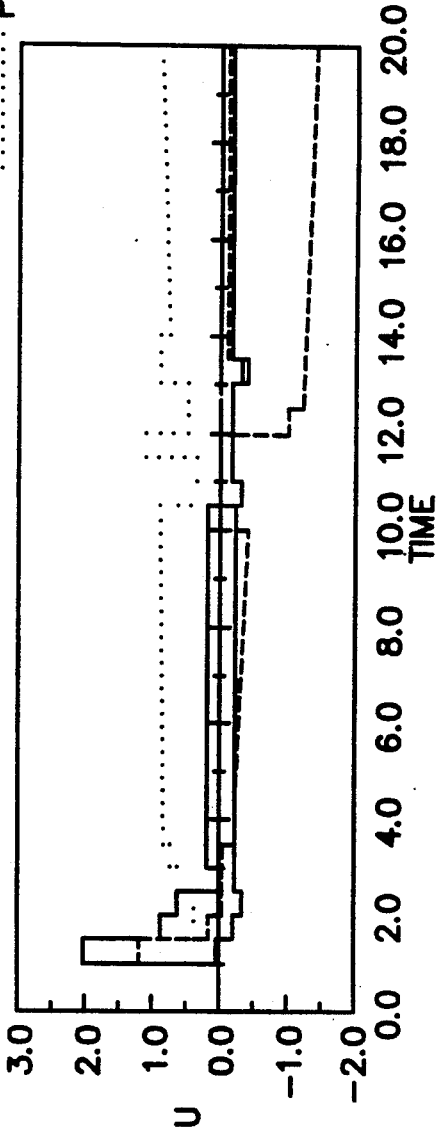

FIGS. 13a and 13b show that the servo-regulatory performance of the cost minimization strategy is virtually the same as that of the basic controller without minimization. A significant reduction in control movement is exhibited during the set point and load change transients. Most of the control movement during the transients is accomplished via the free variables. The steady optimal values of the free inputs before and after the disturbance are $w_1=-0.46$, $w_2=1.19$ and $w_1=-1.30$, $w_2=1.21$ respectively. With the minimization strategy, these equilibrium conditions are rapidly obtained.

Cost performance for this final case is illustrated in FIGS. 14a and 14b. While the comments made relative to FIGS. 11a and 11b apply here as well, the magnitude of the costs are substantially different. Since the incremental costs for the base case are off scale for the majority of the period, they have not been displayed. The striking differences between the two cases shown serve to demonstrate that the steady state optimal values for the free variables can be totally inappropriate for dynamic operation. The cost minimization strategy rapidly approaches the optimal steady state solution both before and after the load disturbance. Conversely, by simply specifying the optimal values of the free variables, the slow modes of the system are unduly excited and the minimum cost steady state solution is approached very slowly.

SUMMARY

A summary of the features of the invention is as follows: The basis for the invention is a robust receding horizon technique of unique form which allows input and output constraints to be easily assigned at the end of the horizon window. The controller requires no manual tuning. Closed loop speed of response or desired closed loop settling time can be directly specified by adjusting the horizon window. Feedforward and feedback compensation are natural elements of the controller which is capable of manipulating a plurality of variables. The predictive nature of the controller can accommodate complex system dynamics and interaction and provides the mechanism for dynamic on-line nonlinear cost minimization via the feedforward model. The tuner and identifier operate to insure that appropriate model and control parameters are always available to the predictor calculation means, control calculation means and optimization calculation means.

Figure 15:
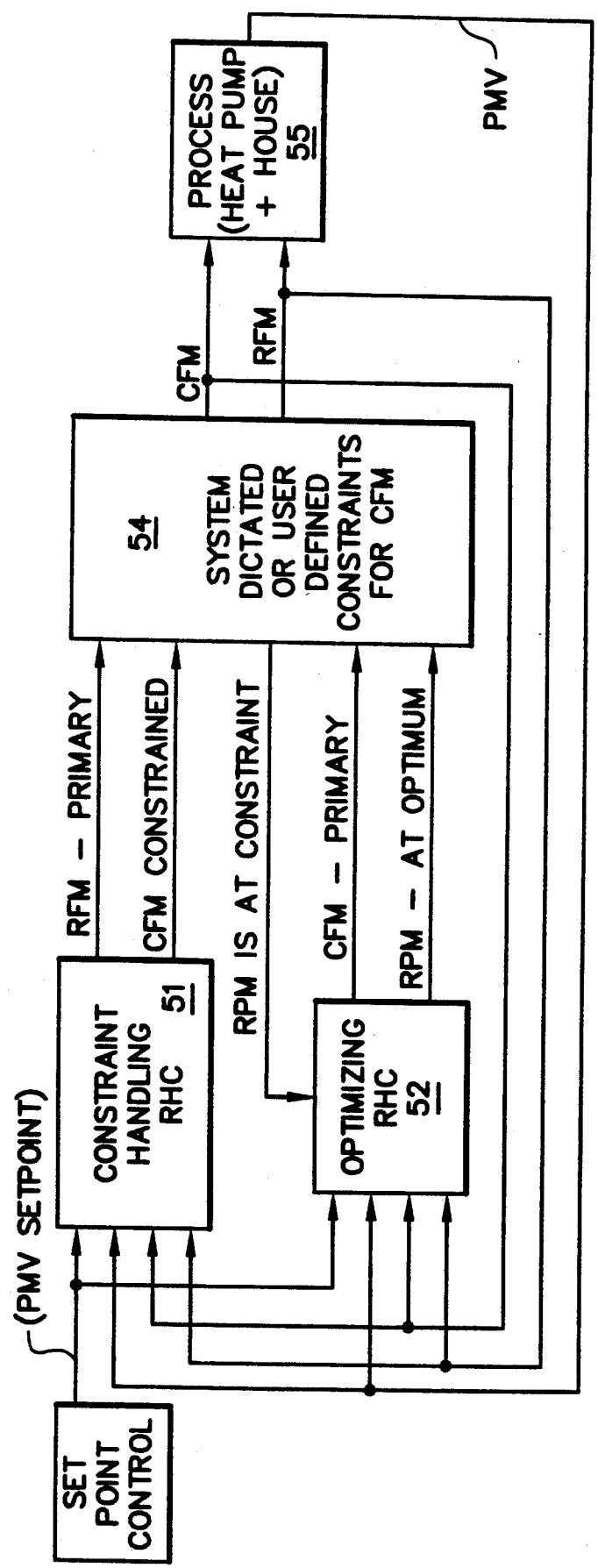
FIG. 15 is a block diagram illustrating a preferred embodiment having additional features to enhance cost control and resolve actuation constraints.

For those situations where it is desirable to set one manipulated variable as primary and another as secondary, we have discovered that the use of a structure like that described in FIG. 15 is appropriate. This embodiment was constructed for a typical heating and ventilation control situation with two manipulated variables and one controlled variable, to demonstrate this feature of the invention.

Predicted Mean Vote (PMV) is a value based on energy balance imposed on the human body and indicates the level of human thermal comfort on a scale from $-3$ (cold) to $+3$ (hot). Conditions that represent a PMV of zero (0) are considered comfortable for 95% of the human population.

Referring now to FIG. 15 wherein the constraint handling apparatus 50 (of the demonstration project) is shown requiring two RHC devices 51 and 52 (which are both like device 10 of FIG. 1), each of which receives a setpoint (in this case a Predicted Mean Vote (PMV) level) into the interface (27 of FIG. 1) for each RHC 51, 52, through the set point control 53.

RHC 51 computes appropriate control moves for its primary variable ("RPM" in the HVAC demonstration case for compressor Revolutions Per Minute) with the potential for adjustments to the other variable ("CFM" or cubic feet per minute that the blower handles, again in the HVAC case) constrained. Those constraints are dependent upon the capacities of the equipment for this demonstration project (the constraints could also be based on a cost function). The information required by the controller is some representation of a numerical value of these constraints. The constraint value can be set at any time, even perhaps determined by sensors which cause the constraint to be adjusted during operation.

At the same time, the RHC 52 does a set of computations to deliver the control moves for CFM as primary with RPM set at optimum. In this case, the control moves involving RPM are more expensive so the optimum case is used preferentially. Once it is determined that a constraint will be violated, performance can no longer be optimized. Instead, the system causes operation to occur within the constraints of the manipulated variables.

The inventive concept of using two controllers as demonstrated with respect to the two variable HVAC application can be extended to cover multiple (more than two) variables. As such, the FIG. 15 diagram would include more than the two RHC's shown; one additional RHC for each new variable. They would cascade such that given the situation of the variables 1, 2, . . . n, where n is the most costly (or otherwise constrained) and 1 is the least costly. The variable 1 would be worked first until it hit a constraint and so on, until variable n is control moved to reach the desired output from the manipulated variable. Accordingly, constraint feedback from each RHC level to its adjacent level must be communicated among the RHC processors such that the RHC for 1 gives constraint input into the RHC for 2 and so on.

To clarify, if a cost function is being performed, the constraint may be cost-based rather than merely that the actuator cannot physically make the control moves desired.

Another design for this system could include using other types of controllers for one or more of the RHC's. However, such arrangements are not recommended at this time because translation of the outputs of one kind of controllers' series of control moves to inputs of a series of control moves to the next kind of controller gets very complicated. Nevertheless, there is no conceptual difficulty with extending this invention in that way.

Figure 16:
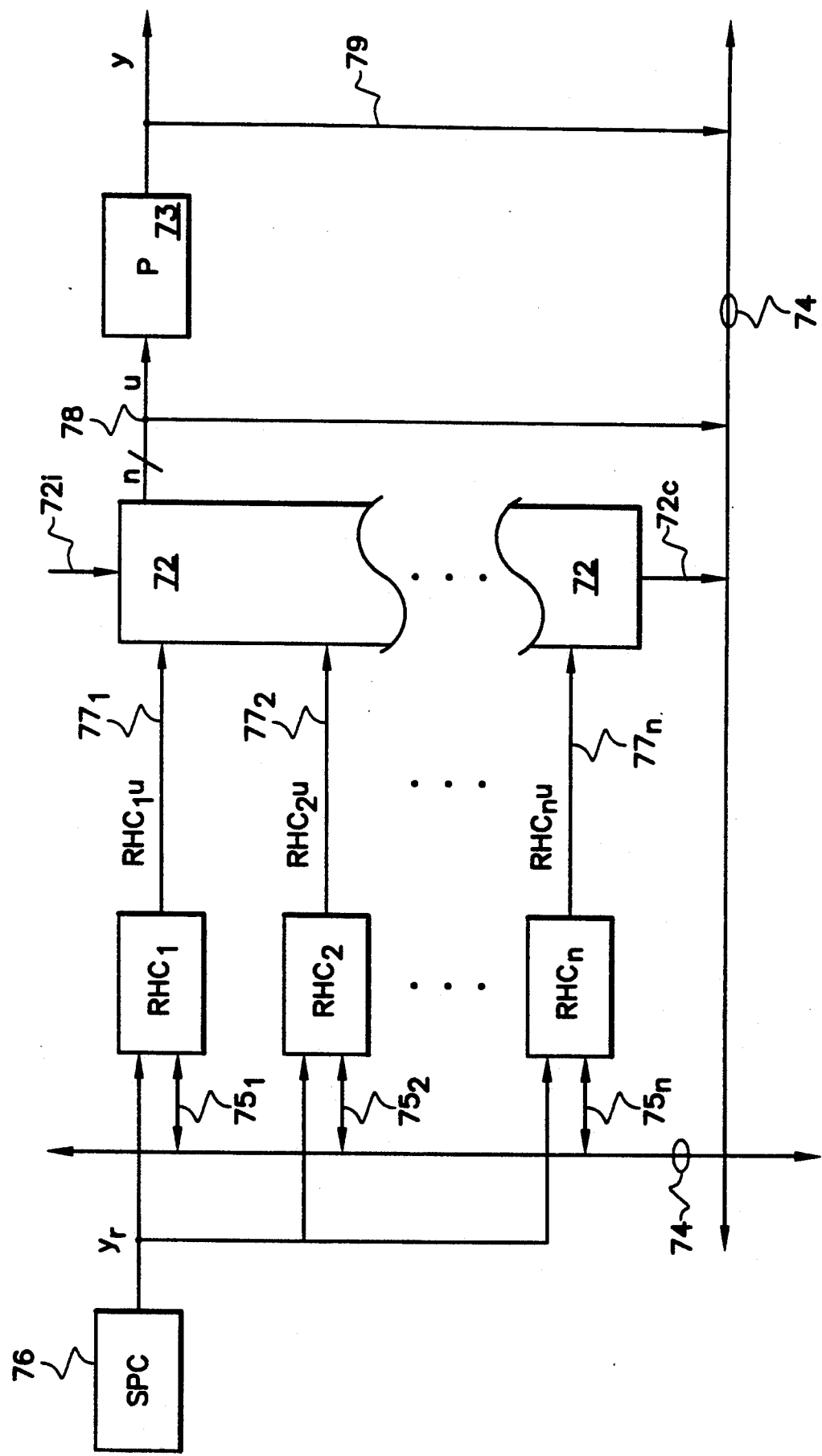
FIG. 16 is a heuristic block diagram of extensions to the basic two-RHC design, having more than two RHC's.

Please refer to FIG. 16 in which a heuristic block diagram representation of a system for constraint handling for nonlinear optimization using a multiplicity of Receding Horizon Controllers 70. Note that the block diagram is simplified through the use of a bus 74 which obviates the need for a multiplicity of feed-back and feed-forward lines between various elements of the system. Since the device could be implemented in hardware or software depending on the speed and other considerations used in the design of the final system, the representation of a bus in this heuristic diagram is simply that; an easy way to show the connecting of outputs and inputs of the various components of the system. (For software, of course, some special storage location could be used for each output and it could be polled by any software configured device as its input.) Construction of these various structures would appear to be well known to those of ordinary skill in the art.

As with the system of FIG. 15, a setpoint control unit 76 (which may be a user, a piece of software, or some hardware input, or some other level of controller) produces an output $y_r$. This $y_r$ should be available to each RHC controller (RHC$_1$, RHC$_2$, . . . RHC$_n$). Other inputs to the RHC controllers are provided by (what is shown here as) bus taps $75_1, 75_2, \ldots 75_n$). The output u for the variable controlled by each RHC is output on line $77_1, 77_2, \ldots 77_n$, these being outputs RHC$_1$u, RHC$_2$u, . . . RHC$_n$u, respectively. These outputs are calculated in the RHC's as was done with the RHC's 51 and 52 of FIG. 15. The output from each is then input into the constraint handling unit 72. The control output or set of outputs u appears on line 78. The line 78 as indicated may contain up to n individual lines, one for each u from each RHC. Again, the process 73 is controlled by this u input or set of u inputs delivered on line 78. The response of the process to the inputs y appears on line 79 and is returned to the bus 74 to inform the RHC's (1−n) of its value. Thus, each RHC can tell what the error value is, that being some function of the difference between y and $y_r$. Again, the bus configuration is shown for illustrative purposes only, and there are various ways to send the signals around between the units as is well known to those of ordinary skill in the art.

The output 72c from constraint handling unit 72 provides an indication to either all RHC units or just the affected ones, that some constraint has been hit and that recalculation of the outputs is required. An input 72i is provided here to illustrate the fact that either a user or a designer can control the values of constraints applied to each one of the RHC outputs as well as the relationship between the constraints imposed on one RHC unit and its effect on the operation of the other RHC units.

Figure 17:
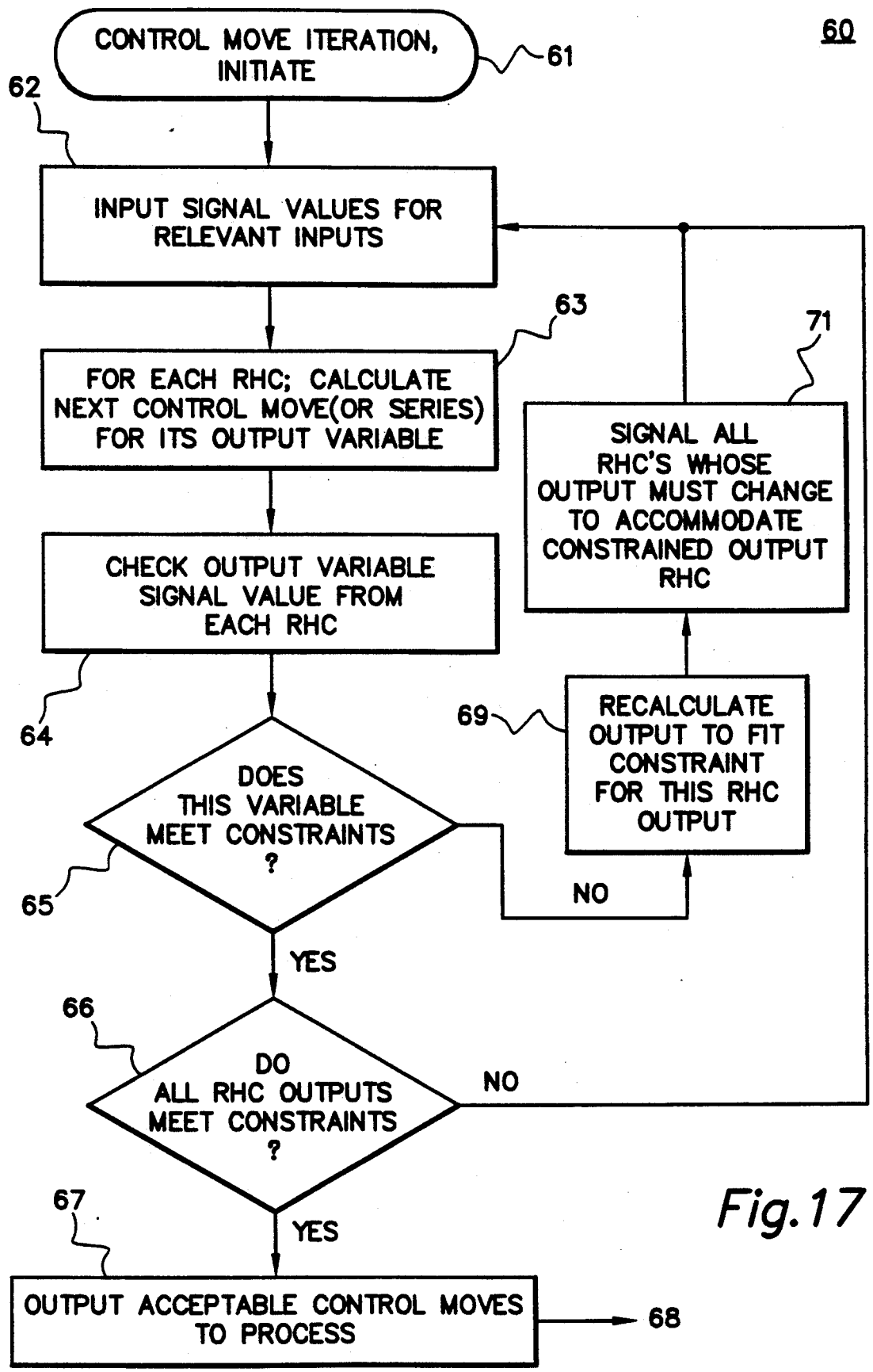
FIG. 17 is a flow chart.

Turning now to FIG. 17, a flow chart 60 can be used to describe the functioning of a device such as system 70 as set forth in FIG. 16. Initially, of course, a control move iteration must be begun and this may require, in various forms or embodiments of the system, clearing out buffers, setting default values, reading in values for constraints, and so forth. This is accomplished in block 61. In block 62, the input signal values for all the relevant inputs for each RHC are input into the RHC's. Thus for example, $y_r$ and y are input as well as any indication of relevant constraint being hit or change in constraint value, as well as all the relevant last outputs for the particular RHC. Next, block 63 requires that each RHC calculate the next control move or series of control moves required for its output variable to operate within the constraints as described earlier with reference to the generalized RHC controller. At this point the outputs RHC$_1$u through RHC$_n$u are output to the constraint handling unit 72 of FIG. 16. In block 64 this output variable signal value from each RHC is checked against the constraints available for those output variables. A decision is made in block 65 whether each variable, or each next variable, meets the constraints. If they do not, the output is recalculated (block 69) to fit the constraint for this particular RHC output. A signal is generated (block 71) available to all RHC's whose output must change to accommodate the constrained RHC output. Next, the input signal values for all the relevant inputs for the RHC's that must recalculate are again input in block 62, and the cycle begins anew. If the variable meets the constraints from the RHC being checked, the next question is, do all the RHC outputs meet the constraints for all of their outputs (block 66)? If not, the input signal values for the relevant inputs (block 62) are received again by each of the RHC's. When all the RHC outputs meet their constraints, the output to the process itself occurs (block 67). An indicator 68 is shown to suggest that this diagram may be cyclic (i.e., the next iteration begins at block 62) or, if preferred, the designer or user of the system may wish to select a period of time or periodicity in which to begin the next set of calculations.

It should be noted that there are numerous ways known to those of ordinary skill in the art, to implement this flow chart. With respect to blocks 65 and 66, for example, the RHC output values may be checked all at once or in some serial order depending on the most efficient way to program for the given constraint codependencies and relationships between the various RHC units. The simplest construction would be to have the least cost or most favored control move generating RHC unit operate as the default output to the process until it is constrained, then upon its constraint go to the next least costly control move variable, and so forth, until the greatest cost control move variable RHC controller is active, with all the others constrained.

This general design provides for flexibility where it may be more efficient to require coupled control moves of more than one actuator at a time to regulate the process. Various combinations will come readily to mind of one of ordinary skill in the art.

Accordingly, the scope of this invention is not to be taken as limited, except as by the following appended claims.

We claim:

1. A controller for controlling manipulated variable inputs to a plant to achieve a desired controlled variable output trajectory which is sensitive to the outputs from said plant wherein said controller receives user input and provides output signals to effect control moves wherein said controller establishes a model indentification based on the manipulated variable inputs and the controlled variable outputs from the plant and comprises:

a tuner for establishing a control sample rate with reference to how long the controlled variable settling time is and on how many controlled and manipulated variable samples are used to identify the model, and for establishing the first m increments of a horizon window which has a total of m+1 increments and a control law calculator means having a recursive model based predictor to predict the nominal control variable output trajectory that would occur without changes to the manipulated variables, said predictor deriving its model from the indentified model, and having a model based corrector, also based on the same identified model, to specify the changes required of the manipulated variable outputs to satisfy the following criteria:

a) the errors between the controlled variables and their respective setpoints become zero after m control moves, b) the errors between the controlled variables and their respective setpoints are zero for l additional control moves, and c) the change in the manipulated variables during the last n control moves of the m+1 horizon take on prescribed beta values which are determined by said control law calculator to be those values necessary to smooth the change in manipulated variables after m control moves and reduce the steady state controlled variable errors, and "means for controlling the controlled variable output based on said specified manipulated variable changes."

2. A controller as set forth in claim 1 wherein said controller further comprises:

optimizer calculator means for providing manipulated variable sequences that results in optimal cost performance without compromising servo-regulatory performance having:

access means for using the control law calculator predictor such that the predictor can be used to predict the effect on the plant as would be measured by the outputs of any hypothetical change made in any manipulated variable, calculator means for determining the optimal set of manipulated variable changes during the horizon window based on the predicted effects of the changes over the horizon window.

3. A controller as set forth in claim 2 wherein said optimizer means establishes an optimal cost value set for the free manipulated variable at the current time increment by iteratively finding the costs for a range of values of the free manipulated variables and selecting the lowest cost subset using the feedforward capability of the control law.

4. A controller as set forth in claim 3 wherein the iterative cost finding function is repeated for each increment within the horizon window and the optimization process is repeated at each control step.

5. A controller as set forth in claim 1 wherein the tuner further comprises a heuristic supervisor means which receives plant output information and manipulated variable information and compares this information on an ongoing basis to detect system instability, and when detected, effects modification of the horizon window to remove the instability.

6. A controller as set forth in claim 5 wherein the determination of instability will provide for one of three alternative actions on the part of the tuner:

a) change the horizon window, b) change the identified model, c) initiate a retune.

7. A controller as set forth in claim 1 where the horizon window established by the tuner is based on the inflection point as well as the line-out of the plant output.

8. A controller as set forth in claim 1 wherein the user input may include specification of the horizon window by specifying any subset or all of the following: one or both of the total lengths of m and l (either by specifying a number of set time length increment units or direct time measurements, such as seconds), the set point, the manipulated variable values in the manual control mode, the control mode (automatic, manual, tune), and a cost function.

9. A multivariable-input multivariable-output controller for controlling a process having at least one receding horizon type controller (hereinafter "RHC") as set forth in claim 1, and at least one other controller, both providing control move output for at least two of said multivariable output variables.

10. A controller as set forth in claim 9 wherein said other controller is also a receding horizon type controller (RHC), and wherein said two variables may be classified as one being primary and the other being secondary and wherein said RHC's may be classified as primary optimum and secondary constrained controllers and wherein said primary optimum RHC produces its output at a first iteration assuming the primary variable must make a control move since the secondary variable is optimized and wherein said secondary constrained RHC produces its output assuming a constrained or no control move situation for said primary variable and produces output based on achieving setpoint using the secondary variable.

11. A controller as set forth in claim 10 wherein said primary optimum and said secondary constrained RHC's outputs are both fed to a constraint checker which determines when said secondary variable has exceeded one or more of the constraints from the following list of constraints (a) the secondary variable suggested exceeds the range of available control moves for the actuator or (b) moving the secondary variable controlled actuator exceeds the user defined cost function for that actuator.

12. A controller as set forth in claim 11 wherein, in the event the constraint checker determines the secondary variable has exceeded these constraints from said list of constraints which are applicable, said constraint checker signals to said secondary constrained RHC this fact.

13. A multivariable-input multivariable-output controller for controlling a process having a multiplicity of receding horizon type controllers (hereinafter referred to as a "RHC") as set forth in claim 1, each providing control move output for at least one of said multivariable output variables, and each said provided output being checked in a constraint handling unit which provides an indicator signal when a constraint on any control move output or combination thereof is exceeded.

14. A controller as set forth in claim 13 wherein one of said multivariables may be classified as being primary to at least one variable and wherein said RHC's may be classified as controlling the primary or one of said secondary variables and wherein said primary RHC produces its output at a first iteration assuming the primary variable must make a control move since any of secondary variables are optimized and wherein said secondary RHC's produce their output assuming constrained or no control move situation for said primary variable and produce output based on achieving setpoint using its secondary variable.

15. A controller as set forth in claim 10 wherein when said constraint handler determines said primary variable has exceeded one or more of its constraints, it instructs by sending a signal to said primary RHC to reissues its primary variable output as constrained and also signals at least one of said secondary RHC's to recompute, assuming the primary variable is constrained and its variable is to be used to effectuate the reference.

16. A process for regulating a system with a controller which provides inputs to a plant and receives outputs from the plant indicating changes in the plant comprising the steps of:
   a) establishing by the controller a horizon window comprised of sampling increments of time such that the sampling interval will be long enough to provide useful control move change periods and short enough to substantially reduce the appearance of unwanted oscillations of the controlled variable trajectory.
   a) predicting the nominal controlled variable output trajectory,
   c) predicting the controlled output trajectory based on the control moves required to reach a user-defined setpoint trajectory at a given time of m increments within the horizon window,
   d) constraining the controlled output trajectory to remain at the user defined output state for l increments beyond said m increments, and constraining the control moves to equal n user-specified betas for the last n increments of the l part of the horizon window.

* * * * *

UNITED STATES PATENT AND TRADEMARK OFFICE
CERTIFICATE OF CORRECTION

PATENT NO. : 5,301,101
DATED : Apr. 5, 1994
INVENTOR(S) : J. Ward MacArthur, David A. Wahlstedt, Michael A. Woessner, Wendy K. Foslien.

It is certified that error appears in the above-indentified patent and that said Letters Patent is hereby corrected as shown below:

Claim 1, column 26, line 8, shall not be in quotation marks and the first word "means" shall be moved four spaces to the left.

Signed and Sealed this

Eighteenth Day of October, 1994

Attest:

BRUCE LEHMAN

*Attesting Officer*   *Commissioner of Patents and Trademarks*